US011881796B2

United States Patent
Dai et al.

(10) Patent No.: US 11,881,796 B2
(45) Date of Patent: Jan. 23, 2024

(54) PERMANENT MAGNET ELECTRIC MACHINE CONTROL

(71) Applicant: ROLLS-ROYCE plc, London (GB)

(72) Inventors: Shangjian Dai, Sheffield (GB); Zhigang Sun, Sheffield (GB); Ellis Fh Chong, Derby (GB); Jiabin Wang, Worksop (GB)

(73) Assignee: ROLLS ROYCE PLC, London (GB)

( * ) Notice: Subject to any disclaimer, the term of this patent is extended or adjusted under 35 U.S.C. 154(b) by 0 days.

(21) Appl. No.: 17/746,189

(22) Filed: May 17, 2022

(65) Prior Publication Data

US 2022/0399841 A1  Dec. 15, 2022

(30) Foreign Application Priority Data

Jun. 8, 2021 (GB) ...................... 2108143

(51) Int. Cl.
*H02P 21/00* (2016.01)
*H02P 21/22* (2016.01)
(Continued)

(52) U.S. Cl.
CPC .......... *H02P 21/0003* (2013.01); *B64D 27/24* (2013.01); *B64D 31/06* (2013.01); *H02P 21/22* (2016.02); *H02P 2101/30* (2015.01)

(58) Field of Classification Search
CPC ...... H02P 21/0003; H02P 21/22; H02P 29/50; H02P 2101/30; Y02T 50/60
See application file for complete search history.

(56) References Cited

U.S. PATENT DOCUMENTS 5,969,500 A * 10/1999 Ishikawa ............... B60L 15/025
318/803
2010/0109583 A1 5/2010 Maekawa et al.
(Continued)

FOREIGN PATENT DOCUMENTS

CN 106385216 A * 2/2017 .............. H02P 21/14
CN 106385216 B 9/2018
EP 2889178 A1 7/2015

OTHER PUBLICATIONS

Yao, et al., "An Improved Deadbeat Predictive Current Control With Online Parameter Identification for Surface-Mounted PMSMs," IEEE Transactions on Industrial Electronics, vol. 67, Issue 12, 2020, pp. 10145-10155, DOI 10.1109/tie.2019.2960755.
(Continued)

*Primary Examiner* — Bickey Dhakal
(74) *Attorney, Agent, or Firm* — Crowell & Moring LLP

(57) ABSTRACT

A method of controlling a permanent magnet synchronous electric machine (PMSM) drive using a Deadbeat Predictive Current Control (DBPCC) scheme is provided. The method comprises: determining d-axis and q-axis stator current values ($i_d$, $i_q$) representative of a measured PMSM current; determining d-axis and q-axis reference current values ($i_d^*$, $i_q^*$); based on the stator current values ($i_d$, $i_q$) and the reference current values ($i_d^*$, $i_q^*$), determining d-axis and q-axis current correction values ($C_d$, $C_q$); determining corrected reference current values ($i_d^{}$, $i_q^{}$) as a sum of the reference current values ($i_d^*$, $i_q^*$) and the current correction values ($C_d$, $C_q$); and controlling the PMSM drive using the corrected reference current values ($i_d^{}$, $i_q^{}$) as reference current inputs of the DBPCC scheme. A controller for performing the method; a system comprising the controller, a PMSM and associated power electronics; and a computer program for performing the method are also provided.

16 Claims, 10 Drawing Sheets

(51) Int. Cl.
*B64D 27/24* (2006.01)
*B64D 31/06* (2006.01)
*H02P 101/30* (2015.01)

(56) References Cited

U.S. PATENT DOCUMENTS

| | | | | |
|---|---|---|---|---|
| 2013/0027000 | A1* | 1/2013 | Deng | H02P 9/02 |
| | | | | 322/24 |
| 2017/0253344 | A1* | 9/2017 | Wangemann | B60L 50/15 |
| 2020/0007058 | A1* | 1/2020 | Xu | H02P 21/141 |
| 2020/0106377 | A1* | 4/2020 | Xu | H02P 21/20 |
| 2022/0105813 | A1* | 4/2022 | He | B60W 10/08 |

OTHER PUBLICATIONS

Zhang, et al., "Deadbeat Predictive Current Control of Permanent-Magnet Synchronous Motors with Stator Current and Disturbance Observer," IEEE Transactions on Power Electronics, vol. 32, Issue 5, 2017, pp. 3818-3834, DOI 10.1109/tpel.2016.2592534.

Wang, et al., "A Hybrid Dual-Mode Control for Permanent-Magnet Synchronous Motor Drives," IEEE Access, vol. 8, 2020, pp. 105864-105873, DOI 10.1109/access.2020.3000238.

Zhang, et al., "Performance Improvement of Model Predictive Current Control of Permanent Magnet Synchronous Motor Drives," IEEE Transactions on Industry Applications, vol. 53, Issue 4, 2017, pp. 3683-3695.

Great Britain search report dated Mar. 3, 2022, issued in GB Patent Application No. 2108143.5.

Wang, et al., "Improved Predictive Current Control with Static Current Error Elimination for Permanent Magnet Synchronous Machine," 40th Annual Conference of the IEEE Industrial Electronics Society, 2014, pp. 661-667.

EP search report dated Sep. 13, 2022, issued in EP Patent Application No. 22172304.

* cited by examiner

PERMANENT MAGNET ELECTRIC MACHINE CONTROL

CROSS-REFERENCE TO RELATED APPLICATIONS

This specification is based upon and claims the benefit of priority from United Kingdom Patent Application No. 2108143.5, filed on 8 Jun. 2021, the entire contents of which is incorporated herein by reference.

BACKGROUND

Technical Field

This disclosure concerns the control of permanent magnet synchronous electric machine (PMSM) drives, and particularly but not exclusively to the control of high-speed PMSM drives for use in aerospace applications.

DESCRIPTION OF THE RELATED ART

Permanent magnet synchronous electric machines (PMSMs) are being investigated for use in transportation applications because of their high power density and efficiency. In aerospace, PMSMs are being proposed for use in so-called more electric aircraft (MEAs), which are powered by gas turbine engines but utilize more electrical power than conventional aircraft, and hybrid electric and purely electric aircraft including Future Air Mobility (FAM) and Urban Air Mobility (UAM) applications. Such applications are expected to involve high machine rotational speeds.

The performance of conventional Field Oriented Control (FOC) of PMSM drives can deteriorate significantly at high machine speeds. This is at least partly because the switching-to-fundamental ratio (SFR), defined as the ratio of the switching frequency of the power electronics semiconductor switches and the electrical fundamental frequency, becomes low at high machine speeds. Consequently, advanced control techniques with fast dynamic response and strong parameter robustness become desirable.

With excellent transient performance, direct torque control (DTC) and model predictive control (MPC) are being investigated to replace FOC. One known variation of DTC and MPC is deadbeat predictive current control (DBPCC). DBPCC is particularly attractive because it also exhibits good steady-state performance, has notably high control bandwidth, is easy to implement with space vector modulation (SVM) based on a digital machine model, and does not require complex stator flux and torque observers.

It would be desirable to improve the performance of DBPCC of PMSM drives, as this could lead to improvements in terms of torque ripple reduction, power and efficiency in systems incorporating PMSMs, especially those operating their PMSMs at high speeds.

The paper "Performance Improvement of Model Predictive Current Control of Permanent Magnet Synchronous Motor Drives" by Y. Zhang et al, in IEEE Transactions on Industry Applications, Vol. 53, No. 4, July/August 2017 proposed an improved MPCC strategy for PMSM drives. The proposed method uses a high order back emf estimator which requires a number of control periods to achieve accurate back-emf estimation. This approach may not be effective at high speeds where a faster dynamic response is necessary and the SFR may be low. The approach also fails to account for inverter non-linearity.

The paper "A Hybrid Dual-Mode Control for Permanent-Magnet Synchronous Motor Drives" by W. Wang et al, in IEEE Access, vol. 8, pp. 105864-105873, 2020 proposes a hybrid model with two control modes: a DBPCC mode for transient operation and a FOC mode for steady state operation. However, the use of two paralleled control methods requires more computational power, and the DBPCC mode will still suffer from sensitivity to parameter variation, especially during high-speed, low SFR operation.

The paper "Improved predictive current control with static current error elimination for permanent magnet synchronous machine," by G. Wang et al, in IECON 2014-40th Annual Conference of the IEEE Industrial Electronics Society, 2014, pp. 661-667 proposes a method for eliminating d-q axis static current error where there is a mismatch between the real system and the model. However, the proposed method will suffer from the dynamic change of speed due to the need for permanent magnet flux estimation adjustment. This can be a particular problem during high-speed operation.

The paper "Deadbeat Predictive Current Control of Permanent-Magnet Synchronous Motors with Stator Current and Disturbance Observer," IEEE Transactions on Power Electronics, vol. 32, no. 5, pp. 3818-3834, May 2017 by X. Zhang et al proposed a disturbance observer based DBPCC scheme for PMSMs. However, this method suffers a number of disadvantages, including computational complexity, poor performance at low SFRs, transient performance deterioration and high frequency disturbances caused by converter nonlinearity and back emf harmonics.

The paper "An Improved Deadbeat Predictive Current Control With Online Parameter Identification for Surface-Mounted PMSMs," IEEE Transactions on Industrial Electronics, vol. 67, no. 12, pp. 10145-10155, December 2020 proposed an improved DBPCC scheme which compensates for parameter uncertainty. This proposed method utilizes a sliding-mode disturbance observer to compensate the steady state error and two extra observers to estimate, in real time, the synchronous inductance and stator resistance of the machine. However, this method suffers a number of disadvantages, including the need to fine-tune the parameters in the observers, chattering, computational complexity and inadequate compensation for converter nonlinearity and back emf harmonics.

Thus, existing control methods may not be able to realize high performance control of PMSMs, which can be subject to parameter uncertainties, converter nonlinearity and/or back emf harmonics under various operating conditions, including high speed operation and low SFR operation, in a cost-effective manner.

SUMMARY

According to a first aspect, there is provided a method of controlling a permanent magnet synchronous electric machine drive using a Deadbeat Predictive Current Control (DBPCC) scheme. The method comprises: determining d-axis and q-axis stator current values ($i_d$, $i_q$) representative of a measured PMSM current; determining d-axis and q-axis reference current values ($i_d^*$, $i_q^*$); based on the stator current values ($i_d$, $i_q$) and the reference current values ($i_d^*$, $i_q^*$), determining d-axis and q-axis current correction values ($C_d$, $C_q$); determining corrected reference current values ($i_d^{}$, $i_q^{}$) as a sum of the reference current values ($i_d^*$, $i_q^*$) and the current correction values ($C_d$, $C_q$); and controlling the PMSM drive using the corrected reference current values ($i_d^{}$, $i_q^{}$) as reference current inputs of the DBPCC scheme.

The d-axis and q-axis current correction values ($C_d$, $C_q$) may be determined independent of parameters of the PMSM and power electronics associated with the PMSM. The term "parameters" will be understood to refer to intrinsic system parameters which are built into the DBPCC machine model, as opposed to extrinsic variables such as current, voltage, flux and torque which vary during use. Machine parameters may also be referred to as 'name plate values'. Name plate values are typically selected during the machine design process, but the true values may differ from the name plate values due to imperfections in the design and manufacture process, as well as aging and exposure to harsh environmental conditions. Examples of machine parameters include the model machine permanent magnet flux linkage, $\psi_m'$, and the model machine synchronous inductance, $L'$. For example, the d-axis and q-axis current correction values ($C_d$, $C_q$) may be determined independent of the model machine permanent magnet flux linkage, $\psi_m$, and the model machine synchronous inductance, $L'$.

The d-axis and q-axis current correction values ($C_d$, $C_q$) may be determined according to the equations:

$$C_d(k+1) = C_d(k) + \eta e_{id}(k)$$

$$C_q(k+1) = C_q(k) + \eta e_{iq}(k)$$

wherein $\eta$ is a pre-selected gain value, and $e_{id}$ and $e_{iq}$ are d-axis and q-axis current errors.

The d-axis and q-axis current correction values ($C_d$, $C_q$) may be determined according to the equations:

$$C_d(k) = \frac{\eta}{1-z^{-1}} \cdot e_{id}(k)$$

$$C_q(k) = \frac{\eta}{1-z^{-1}} \cdot e_{iq}(k)$$

wherein $\eta$ is a gain value, and $e_{id}$ and $e_{iq}$ are d-axis and q-axis current errors.

A higher gain value $\eta$ reduces the time taken to drive the control error to zero, but an excessively high value may generate undesirably large fluctuations during the transient. The value can therefore be pre-selected based on experiments, and will generally have a value of less than 0.1, for example between 0.005 and 0.05.

The d-axis and q-axis current errors ($e_{id}$, $e_{iq}$) may be determined according to the equations:

$$i_d^* - i_d = e_{id}$$

$$i_q^* - i_q = e_{iq}.$$

The d-axis and q-axis current errors ($e_{id}$, $e_{iq}$) may be determined according to the equations:

$$e_{id}(k) = i_d^*(k) \cdot z^{-m} - i_d(k)$$

$$e_{iq}(k) = i_q^*(k) \cdot z^{-m} - i_q(k)$$

wherein z is the Laplace operator in discrete form, m is an integer greater than or equal to 2, and k is an integer. The value of m may be equal to 2.

Determining the d-axis and q-axis current correction values ($C_d$, $C_q$) may comprise determining and summing a plurality of current correction components including a fundamental current correction component ($C_{d,0}$, $C_{q,0}$) and at least one harmonic current correction component ($C_{d,n}$, $C_{q,n}$).

The at least one harmonic current correction component ($C_{d,n}$, $C_{q,n}$) may include at least one $n^{th}$ order harmonic current correction component, ($C_{d,n}$, $C_{q,n}$) wherein n satisfies (n+1)/6=p or (n−1)/6=p, p being an integer (i.e. p=1, 2, 3, . . . ). The at least one harmonic current correction component ($C_{d,n}$, $C_{q,n}$) may include a $5^{th}$ and/or $7^{th}$ order harmonic current correction component. The at least one harmonic current correction component ($C_{d,n}$, $C_{q,n}$) may also include an $11^{th}$ and/or $13^{th}$ order harmonic current correction component.

The at least one harmonic current correction component ($C_{d,n}$, $C_{q,n}$) may include a second and/or third order harmonic current correction component.

Each of the at least one harmonic current correction components ($C_{d,n}$, $C_{q,n}$) may be determined based at least in part on a rotor angular position of the PMSM ($\Theta_e$) and a rotor angular speed of the PMSM ($\omega_e$). The determination may be further based a phase factor determined according to a harmonic order (n) of the harmonic component. The determination may be further based on a sampling time-step ($T_s$). The determination may be further based on a gain value ($\eta$). The determination may be further based on a current error value ($e_{id}$, $e_{iq}$).

The method may further comprise: determining an estimate of an inductance of the PMSM. Controlling the PMSM drive may further comprise using the estimated inductance of the PMSM as an input of the DBPCC scheme.

The determination of the estimate of the inductance ($L_s$) of the PMSM may be based on one or more reference current values ($i_d^*$, $i_q^*$) and one or more stator current values ($i_d$, $i_q$) during a transient.

The determination of the estimate of the inductance ($L_s$) of the PMSM may be based on a difference between a reference current value ($i_d^*$, $i_q^*$) and a stator current value ($i_d$, $i_q$). The determination may be based on a q-axis reference current value ($i_q^*$) and a q-axis axis stator current value ($i_q$).

The estimate of the inductance ($L_s$) of the PMSM may be determined according to the equations:

$$L_s = \hat{L}_s + \frac{r}{1-r} \cdot \hat{L}_s$$

$$r = (i_q^* - i_q)/\Delta i_q^*$$

$$\Delta i_q^* = i_q^* - i_q^* \cdot z^{-1}$$

wherein $\hat{L}_s$ is a previous estimate of the inductance of the PMSM and z is the Laplace operator in discrete form.

The PMSM may be controlled to rotate at a high speed, for example a speed greater than or equal to 12,000 rpm.

The PMSM drive may be controlled to operate at a low switching-to-fundamental ratio (SFR), for example an SFR of less than or equal to 10, less than or equal to 8, or even less than or equal to 6. The SFR is defined as:

$$SFR = \frac{f_{inv}(Hz)}{f_e(Hz)}$$

wherein $f_{inv}$ is the switching frequency of power electronics associated with the PMSM drive, and $f_e$ is the fundamental electrical frequency of the PMSM.

According to a second aspect, there is provided a computer program comprising code which, when executed by a computer system, causes the computer system to perform the method of the first aspect.

According to a third aspect, there is provided a non-transitory computer-readable storage medium having program code stored thereon which, when executed by a computer system, causes the computer system to perform the method of the first aspect. The non-transitory computer readable medium may be any suitable medium known in the art. Examples include but are not limited to ROM, RAM, a hard disk, a solid-state drive, flash memory and an optical storage device.

According to a fourth aspect, there is provided a controller for use in a system comprising a permanent magnet synchronous electric machine (PMSM) and associated power electronics. The controller is configured to: receive d-axis and q-axis stator current values ($i_d$, $i_q$) representative of a measured PMSM current; receive d-axis and q-axis reference current values ($i_d^*$, $i_q^*$); based on the stator current values ($i_d$, $i_q$) and the reference current values ($i_d^*$, $i_q^*$), determine d-axis and q-axis current correction values ($C_d$, $C_q$); determine corrected reference current values ($i_d^{}$, $i_q^{}$) as a sum of the reference current values ($i_d^*$, $i_q^*$) and the current correction values ($C_d$, $C_q$); and control the PMSM using the corrected reference current values ($i_d^{}$, $i_q^{}$) as reference current inputs to the DBPCC scheme.

According to a fifth aspect, there is provided a system comprising a permanent magnet synchronous electric machine (PMSM); power electronics in electrical communication with the PMSM; and the controller of the fourth aspect.

The PMSM may be a high-speed PMSM. The PMSM may, for example, have a maximum rated speed greater than or equal to 15,000 rpm, or even higher.

According to a sixth aspect, there is provided a gas turbine engine comprising the system of the fifth aspect. A rotor of the PMSM may be coupled with a spool of the gas turbine engine.

According to a seventh aspect, there is provided an aircraft propulsion system comprising the system of the fifth aspect or the gas turbine engine of the sixth aspect.

According to an eight aspect, there is provided an aircraft comprising the system of the fifth aspect; or the gas turbine engine of the sixth aspect; or the aircraft propulsion system of the seventh aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
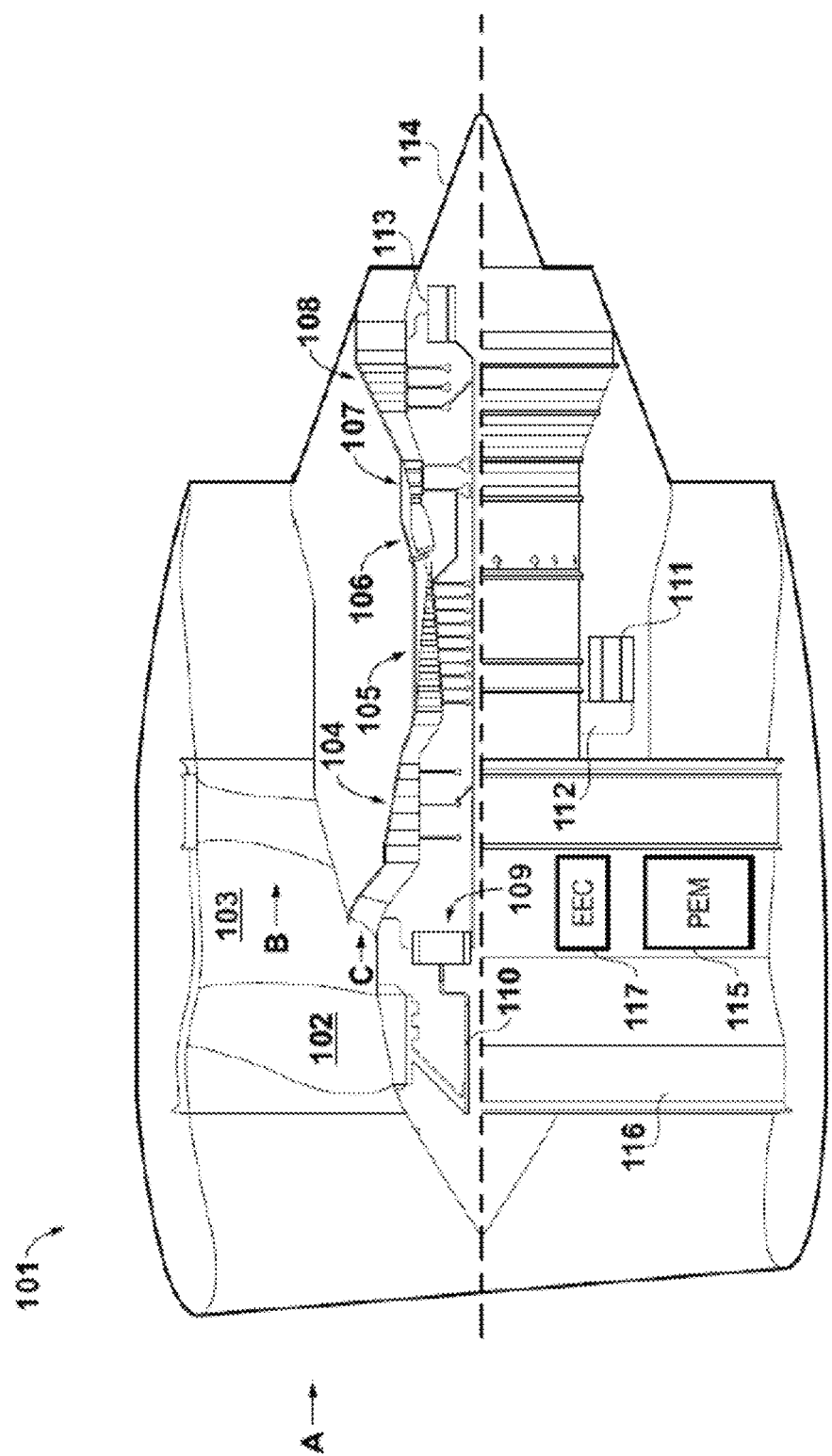
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially inline with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electric machines 111, 113 compared with those of conventional gas turbines.

Figure 2A:
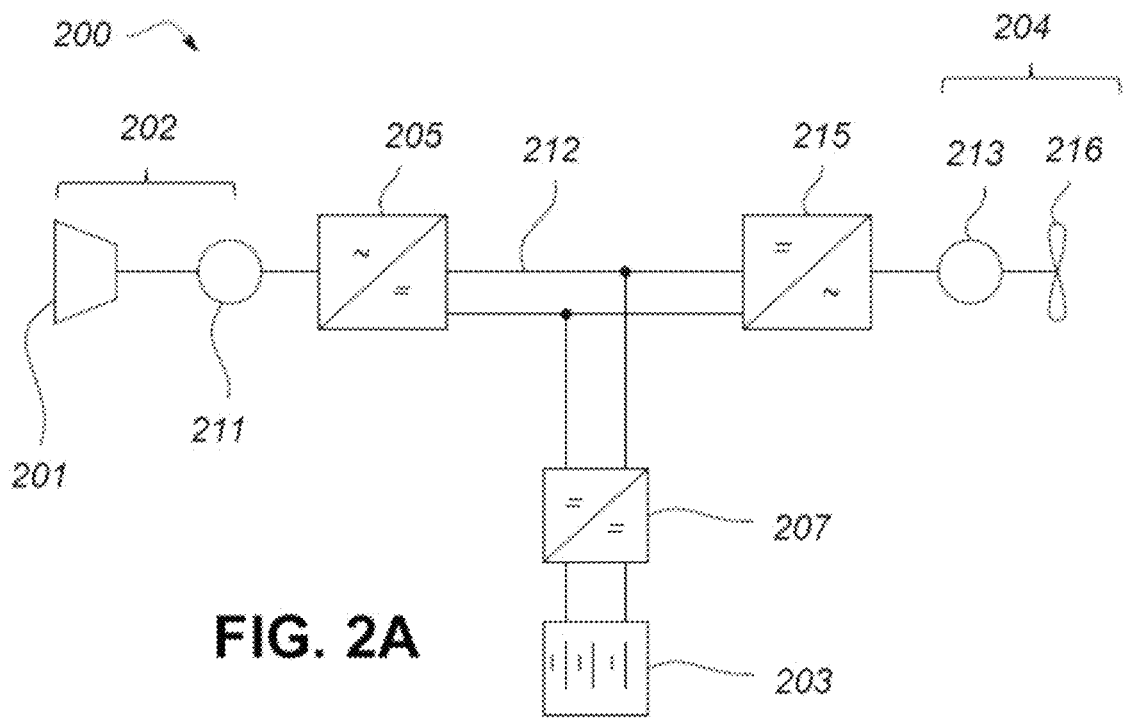
FIG. 2A is a schematic illustration of a hybrid electric aircraft propulsion system.
Figure 2B:
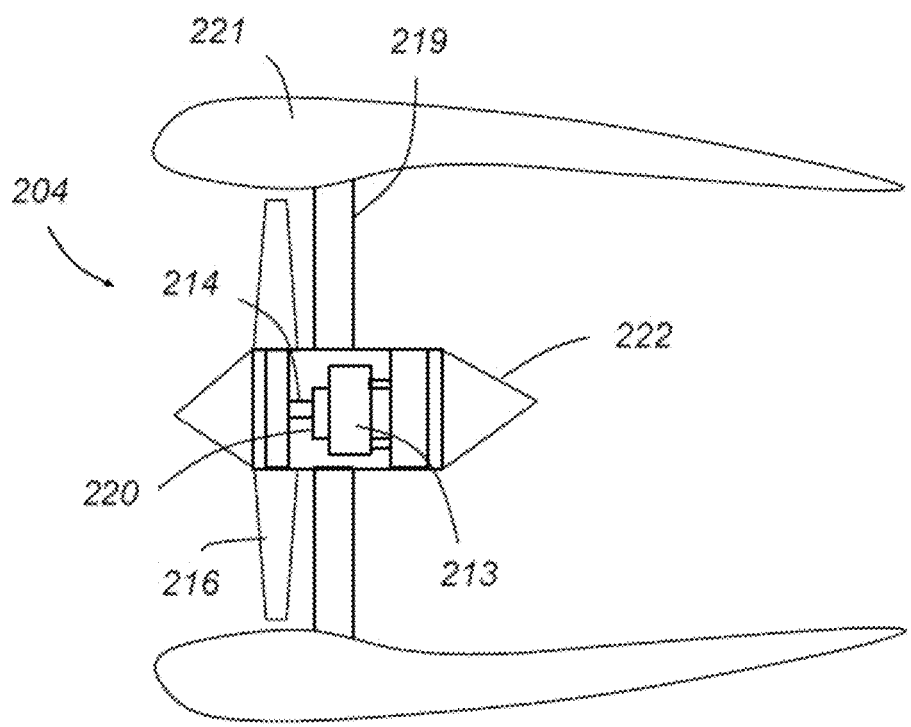
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising an engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 212, a DC/AC converter 215 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 212. These electrical systems include non-propulsive loads (not shown in FIG. 2A) and the motor 213 which drives the propulsor 204 via the DC/AC converter 215.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 212) or can be charged using the power provided by the generator set 202 (by being fed by the dc distribution bus 212).

Referring to FIG. 2B, in this example the propulsor 204 takes the form of a ducted fan. The fan 216 is enclosed within a fan duct 219 defined within a nacelle 221, and is mounted to a core nacelle 212. The fan 216 is driven by the electric machine 213 via a drive shaft 214, both of which may also be thought of as components of the propulsor 204. In this embodiment a gearbox 220 is provided between the electric machine 213 and the drive shaft 214.

The electric machine 213 is supplied with electric power from a power source, for example the generator set 202 and/or the battery 203 via the dc bus 212. The electric machine 213 of the propulsor, and indeed the electric machine 211 of the generator set 202, may generally be of any suitable type, for example of the permanent magnet synchronous type.

Those skilled in the art will recognize the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electric machines. For example, the electric machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and that other architectures, including architectures with ac distribution busses, are known and will occur to those skilled in the art.

FIG. 3

Figure 3:
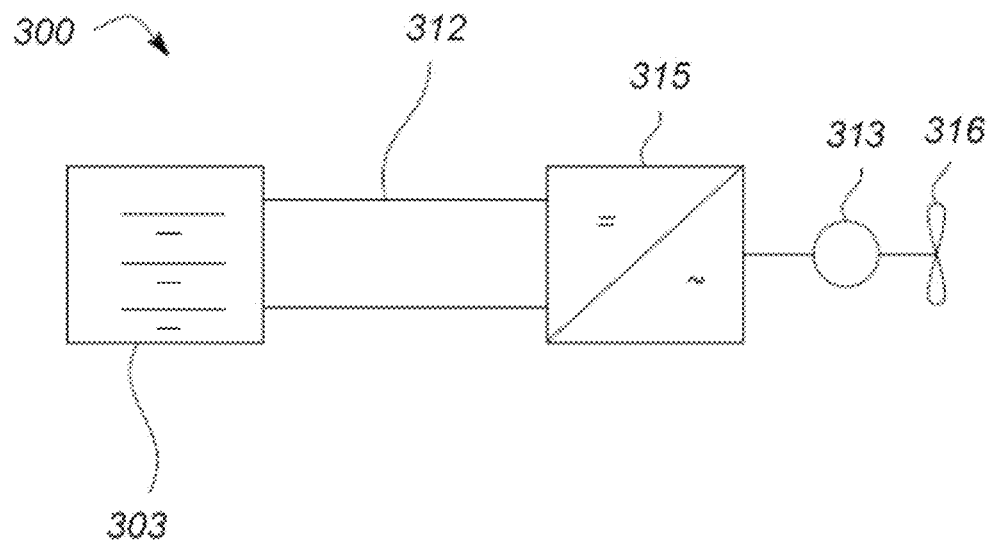
FIG. 3 is a schematic illustration of a purely electric aircraft propulsion system.

FIG. 3 illustrates an exemplary electric propulsion system 300 of a purely electric aircraft. Alternative electric propulsion system arrangements are known and will occur to those skilled in the art.

The propulsion system 300 includes a battery pack 303 that feeds a HVDC distribution bus 312, possibly via a DC/DC converter (not shown), which delivers power to one or more synchronous motors 313 via a DC/AC converter 315. The one or more motors 313 drive the one or more propellers 316 that propel the aircraft.

FIG. 4

Figure 4:
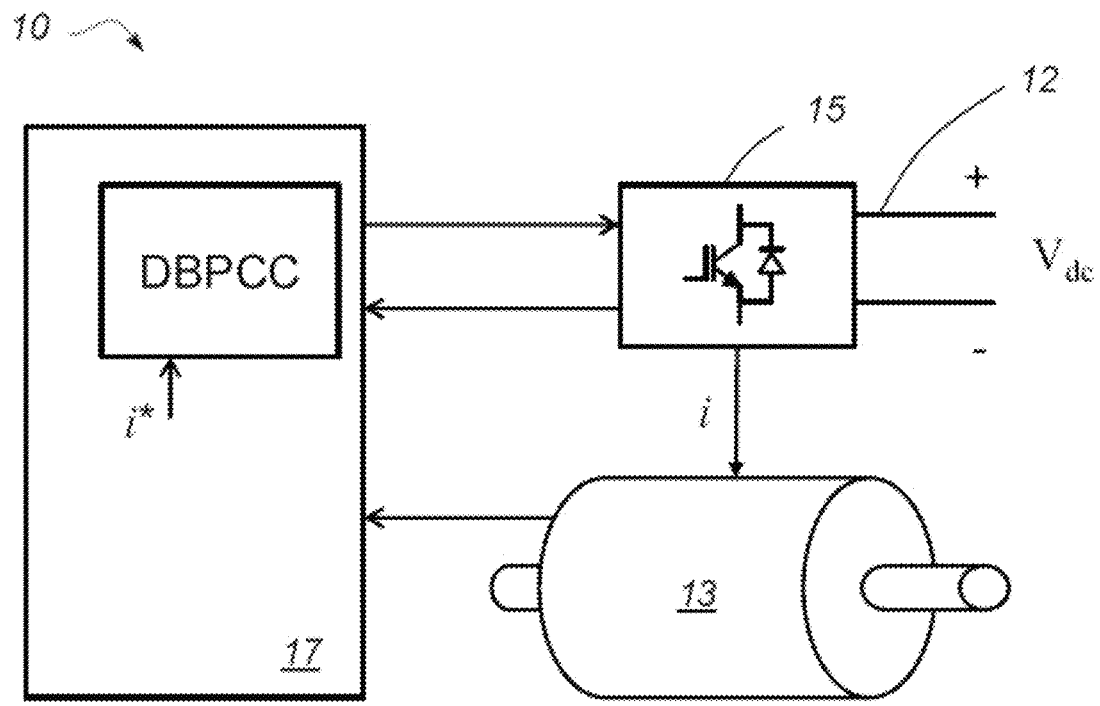
FIG. 4 is a schematic illustration of a permanent magnet synchronous electric machine (PMSM) drive system with Deadbeat Predictive Current Control (DBPCC)

FIG. 4 illustrates a general arrangement 10 in which a controller 17 implements a Deadbeat Predictive Current Control (DBPCC) scheme to control the operation of a permanent magnet synchronous electric machine (PMSM) drive. The arrangement 10 could be implemented within a solely gas-turbine-powered aircraft (e.g. an engine 101 of a 'more electric aircraft' as depicted in FIG. 1), in a hybrid electric propulsion system (e.g. the hybrid electric propulsion system 200 of FIGS. 2A-B), in a purely electric aircraft (e.g. the electric propulsion system 300 of FIG. 3) or indeed in a non-aerospace platform such an electric or hybrid electric automobile.

The arrangement includes a power electronics converter 15 which receives electrical power from a power source 12, which in this case is a dc bus 12. The converter 15 inverts the power and supplies it to the PMSM 13. Alternatively, if the PMSM 13 is configured as a generator, the converter receives power from the PMSM 13, rectifies it and provides this power to the dc bus 12.

The controller 17, which may be implemented in hardware, software or a combination of the two, and which may include one or more functional modules, provides control signals to the power electronics converter 15 in order to control the operation of the PMSM 13. For instance, the controller may control gate voltages and duty cycles of the semiconductor switches of the converter 15 in order to control the stator current and rotor speed of the PMSM 13.

The DBPCC control scheme utilizes a pre-defined electric machine model which is based on the design specifications of the machine. Parameter values such as the machine inductance L and the flux linkage $\psi_m$, as well as other 'name plate' parameter values are defined within the machine model. Furthermore, both the PMSM 13 and the converter 15 provide feedback to the controller 17, illustrated in FIG. 4 by the arrows from the PMSM 13 and converter 15 to the controller 17. For example, current transducers measure the current supplied by the converter 15 to the PMSM 13 and these current measurements are fed back to the controller 17. A position sensor (e.g. and encoder and a resolver) likewise measures the rotor angular position and speed and feeds these measurements back to the controller 17.

In a current control scheme such as DBPCC, the controller 17 attempts to control the drive so that the actual current supplied to PMSM 13, denoted by i, is equal to a desired value, denoted i* and generally known as the reference current or current command. Ideally, i=i*. However, imperfections in the model, inverter non-linearity, and deviations between the actual, true machine parameter values (e.g. inductance L and the flux linkage $\psi_m$) and the name plate parameter values due to imperfections in machine design and manufacture, aging and environmental conditions (e.g. temperature) mean that the actual current i deviates from the desired current i*. Deviations between the actual and model parameter values may be referred to as "parameter mismatch". The resulting difference between i and i* may be referred to as "current control error".

FIG. 5

Figure 5:
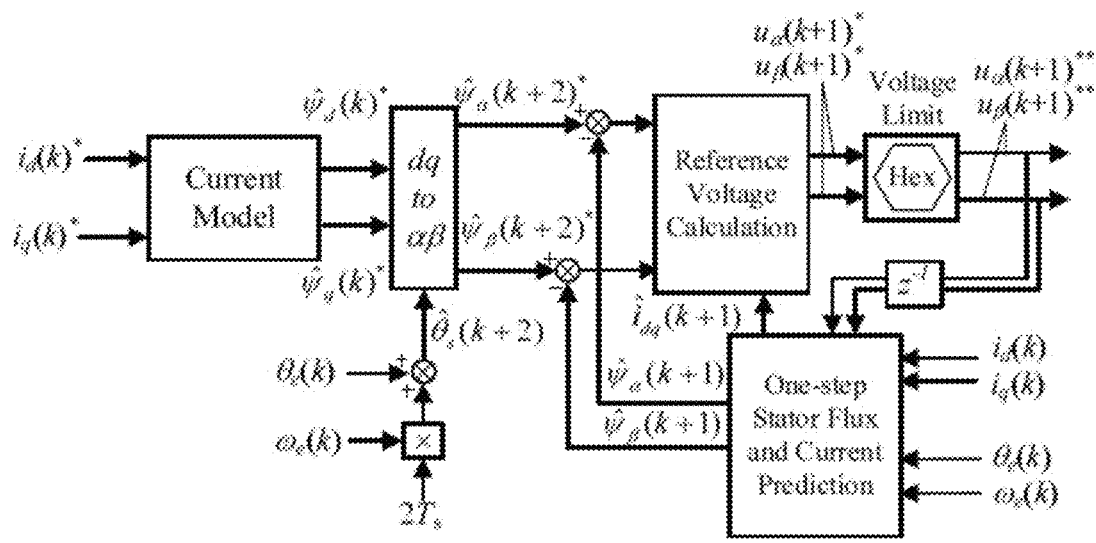
FIG. 5 illustrates an exemplary DBPCC control scheme for controlling a PMSM drive.

FIG. 5 is a block diagram of a stationary frame-based DBPCC scheme of a conventional type which may be used to control a high-speed PMSM drive. Those skilled in the art will appreciate that this or another DBPCC scheme may be used to implement embodiments, which are described below with reference to FIGS. 6-12.

In the interests of conciseness, the DBPCC scheme of FIG. 5 is only briefly described. In the following description the subscripts as refer to the components of quantities under the alpha-beta transformation and the subscripts dq refer to components of quantities under the direct-quadrature transformation, both of which will be familiar to those skilled in the art of power electronics and electric machine control.

Starting from reference currents i*, the illustrated DBPCC scheme includes three main parts: calculation of reference stator fluxes by the current model, one-step prediction of stator flux and current to compensate a one-step processing delay, and synthesis of reference voltage to realize deadbeat control.

The current model of the PMSM is given by:

$$\Psi_{dq} = L_s i_{dq} + \psi_m \quad (1)$$

where $\Psi$ and i denote the stator flux and current vectors, respectively; the subscript dq denotes the variable in the dq frame; $L_s$ represents the synchronous inductance of the surface mounted PMSM (SPMSM) while for the interior PMSM (IPMSM) the dq-axis inductances should be used accordingly for each axis component; $\Psi_m$ is the PM flux linkage.

Assuming that the machine speed is constant over a control interval, the rotor angular position at step k+1 can then be defined as $\theta_e(k) + \omega_e(k)T_s$, where $\theta_e(k)$ and $\omega_e(k)$ are the sampled rotor angular position and speed at the $k^{th}$ step, respectively, and $T_s$ is the sampling period, i.e. the control time step. The reference stator flux vector in the stationary frame at step k+2 can then be calculated as:

$$\Psi_{\alpha\beta}(k+2)^* = [L_s i_{dq}(k)^* + \psi_m] \cdot e^{j[\theta_e(k) + 2\omega_e(k)T_s]} \quad (2)$$

where the superscript * denotes the reference value; the subscript αβ denotes the variable in the αβ frame; e is the base of the natural logarithm and $e^{jx}$ represents the anticlockwise rotation of a vector by x radians.

With SVM and ignoring the inverter nonlinearity, the stator flux vector at the next step can be predicted by the voltage model as:

$$\Psi_{\alpha\beta}(k+1) = \Psi_{\alpha\beta}(k) + T_s u_{\alpha\beta}(k)^* - RT_s i_{\alpha\beta}(k) \quad (3)$$

where R is the phase resistance. The reference stator voltage vector, $u_{\alpha\beta}(k)^*$, is calculated and applied to the drive at the present step. The present stator flux vector $\Psi_{\alpha\beta}(k)$, can be estimated according to the current model of (1) and the coordinate transformation by:

$$\Psi_{\alpha\beta}(k) = [L_s i_{dq}(k) + \psi_m] \cdot e^{j\theta_e(k)} \quad (4)$$

Therefore, the reference stator voltage for step k+1, $u_{\alpha\beta}(k+1)^*$ can be synthesized by the difference of the reference stator flux vector at step k+2 and the estimated stator flux vector at step k+1 according to:

$$\mu_{\alpha\beta}(k+1)^* = \frac{\psi_{\alpha\beta}(k+2)^* - \psi_{\alpha\beta}(k+1)}{T_s} + Ri_{dq}(k+1) \cdot e^{j[\theta_E(k)+\omega_e T_s]} \quad (5)$$

As can be seen, the reference stator voltage vector for achieving deadbeat control of the reference stator flux vector and hence the reference dq-axis currents are controlled directly in the stationary frame. The rotor position-dependent coordinate system conversion from the dq frame to the αβ frame as in the conventional dq frame model-based DBPCC is avoided. Thus, this stationary frame-based DBPCC is robust to the large rotor movement in a time-step at high speeds with low SFRs.

However, it can be seen that the performance of the DBPCC is reliant on the accuracy of the current model and voltage model of PMSM. In practice, the control performance of DBPCC can be heavily influenced by the accuracy of the machine parameters as well as the inverter nonlinearity.

FIG. 6

As noted above, the DBPCC of high-speed PMSM drives with state flux vector tracking exhibits relative robust transient performance, but the steady-state control accuracy will deteriorate significantly under parameter uncertainty and inverter nonlinearity. To improve the parameter robustness of the DBPCC scheme, the present disclosure proposes a novel correcting current injection technique to reduce or eliminate the steady-state current errors. The scheme is described in detail below and shown in block form in FIG. 6.

The steady-state dq-axes currents under parameter mismatch and inverter nonlinearity can be rewritten in the component form as:

$$\begin{cases} i_d = \lambda_{L1} \cdot i_d^* + \lambda_{L2} \cdot i_q^* + \lambda_{\psi1} + \lambda_{inv1} \\ i_q = \lambda_{L1} \cdot i_q^* - \lambda_{L2} \cdot i_d^* + \lambda_{\psi2} + \lambda_{inv2} \end{cases} \quad (6)$$

where the coefficients, $A_{L1}$ and $A_{L2}$ relate to the inductance mismatch; $\lambda_{\psi1}$ and $\lambda_{\psi2}$ relates to the PM flux linkage mismatch; $\lambda_{inv1}$ and $\lambda_{inv2}$ relates to the inverter nonlinearity. These quantities are given by equations (7)-(8):

$$\begin{cases} \lambda_{L1} = \dfrac{a}{a^2+b^2} \\ \lambda_{L2} = \dfrac{b}{a^2+b^2} \\ \lambda_{\psi1} = \lambda_{L1} \cdot c + \lambda_{L2} \cdot d \\ \lambda_{\psi2} = \lambda_{L1} \cdot d + \lambda_{L2} \cdot c \\ \lambda_{inv1} = -\lambda_{L2} \cdot \dfrac{2T_s V_{inv\_qav}}{\hat{L}_s} \\ \lambda_{inv2} = -\lambda_{L1} \cdot \dfrac{2T_s V_{inv\_qav}}{\hat{L}_s} \end{cases} \quad (7)$$

$$\begin{cases} a = 1 + \dfrac{\Delta L_s}{\hat{L}_s}[1-\cos(2\omega_e T_s)] \\ b = \dfrac{\Delta L_s}{\hat{L}_s}\sin(2\omega_e T_s) \\ c = -\dfrac{\Delta \psi_m}{\hat{L}_s}[1-\cos(2\omega_e T_s)] \\ d = -\dfrac{\Delta \psi_m}{\hat{L}_s}\sin(2\omega_e T_s) \end{cases} \quad (8)$$

In equations (7)-(8), $V_{inv\_qav}$ is the inverter nonlinearity caused voltage drop in the q-axis. "^" denotes the estimated/name-plate quantity and Δ denotes the quantity error, defined by the real value subtracting the estimated/name-plate value.

The proposed steady-state current control error compensation method is to inject two correcting components, which may be referred to as reference correcting currents (RCCs), denoted as $C_d$ and $C_q$, into the original d-axis and q-axis current references, $i_d^*$ and $i_q^*$ to obtain new, corrected reference currents, $i_d^{}$ and $i_q^{}$ as expressed in (9). These modified references, $i_d^{}$ and $i_q^{}$, are then fed to the DBPCC as its reference inputs.

$$\begin{cases} i_d^{**} = i_d^* + C_d \\ i_q^{**} = i_q^* + C_q \end{cases} \quad (9)$$

Combining (9) and (6), the steady-state current will become:

$$\begin{cases} i_d = \lambda_{L1} \cdot (i_d^* + C_d) + \lambda_{L2} \cdot (i_q^* + C_q) + \lambda_{\psi1} + \lambda_{inv1} \\ i_q = \lambda_{L1} \cdot (i_q^* + C_q) - \lambda_{L2} \cdot (i_d^* + C_d) + \lambda_{\psi2} + \lambda_{inv2} \end{cases} \quad (10)$$

To nullify the current control error, the desired RCCs can be solved as given in:

$$\begin{cases} C_d^* = A \cdot i_d^* + B \cdot i_q^* + C \\ C_q^* = A \cdot i_q^* + B \cdot i_d^* + D \end{cases} \quad (11)$$

where the coefficients are:

$$A = \frac{(\lambda_{L1} - \lambda_{L1}^2 - \lambda_{L2}^2)}{\lambda_{L1}^2 + \lambda_{L2}^2} \quad (12)$$

$$B = -\frac{\lambda_{L2}}{\lambda_{L1}^2 + \lambda_{L2}^2}$$

$$C = -\lambda_{L1}\lambda_{\psi1} + \lambda_{L2}\lambda_{\psi2} - \lambda_{L1}\lambda_{inv1} + \lambda_{L2}\lambda_{inv2}$$

$$D = -\lambda_{L2}\lambda_{\psi1} - \lambda_{L1}\lambda_{\psi2} - \lambda_{L2}\lambda_{inv1} - \lambda_{L1}\lambda_{inv2}$$

Injecting the desired RCCs in to the original reference currents, namely substituting (11) into (8), will ultimately lead to $i_{dq}=i_{dq}^*$ regardless of the parameter mismatch and inverter nonlinearity, which indicates the current control error is eliminated and the control performance of the DBPCC with the desired RCCs is parameter independent. It is noted that the analytical expression (6) only considers the average current, and therefore zero current control error here refers to zero average error.

It will be appreciated that the coefficients in (8) are machine parameter dependent. Consequently, if parameter independent RCCs are desired, they cannot be calculated out by (11). An online adaptive scheme which derives the injected RCCs independent of the machine parameters and minimizes the current control error is therefore proposed.

An objective function to minimize the current control error can be defined as:

$$J = \frac{1}{2}(i_{dq}^* - i_{dq})^2 = \frac{1}{2}e_{id}^2 + \frac{1}{2}e_{iq}^2 \qquad (13)$$

where $e_{id}$, $e_{iq}$ are the sampled current errors in the d-axis and q-axis, respectively. Substituting $C_d^*$, $C_q^*$ into (10) and rearranging gives the current errors as:

$$e_{id} = \lambda_{L1}\Delta C_d + \lambda_{L2}\Delta C_q \qquad (14)$$

$$e_{iq} = \lambda_{L1}\Delta C_q - \lambda_{L2}\Delta C_d \qquad (15)$$

where:

$$\Delta C_d = C_d^* - C_d \qquad (16)$$

$$\Delta C_q = C_q^* - C_q \qquad (17)$$

Computing the gradient vector of the objective function, J with respect to $C_d$ and $C_q$ respectively and combining equations (13)-(17) yields:

$$\nabla J_1 = \frac{\partial J}{\partial COMP_d} = -\lambda_{L1}e_{id} \qquad (18)$$

$$\nabla J_2 = \frac{\partial J}{\partial COMP_q} = -\lambda_{L1}e_{iq} \qquad (19)$$

According to the gradient descent updating rule, the injected RCC magnitudes, $C_d$ and $C_q$ are determined by:

$$C_d(k+1) = C_d(k) - \eta \nabla J_1 \qquad (20)$$

$$C_q(k+1) = C_q(k) - \eta \nabla J_2 \qquad (21)$$

where $\eta$ is the adaptive gain.

According to the expression of $\lambda_{L1}$ in (7) and (8), it is equal to one with accurate inductance and deviates from one if the estimated inductance is not equal to the actual inductance. However, it is constant or varies slowly with inductance mismatch. Therefore, $\lambda_{L1}$ in the gradient expressions (18) and (19) can be reasonably approximated as equal to one. By substituting (18) and (19) into (21) and (21), the adaptation law is finally derived as:

$$C_d(k+1) = C_d(k) + \eta e_{id}(k) \qquad (22)$$

$$C_q(k+1) = C_q(k) + \eta e_{iq}(k) \qquad (23)$$

Taking convergence speed and steady-state performance into consideration, the adaptive gain $\eta$ can be pre-selected based on experiments. A higher gain value $\eta$ reduces the time taken to eliminate the control error to be driven to zero, but an excessively high value may generate undesirably large components during the transient. The value will generally have a value of less than 0.1, for example between 0.005 and 0.05.

Due to the two time-step delay of the DBPCC, the present current actually corresponds to the reference two time-steps before, thus the dq axis current error, $e_{idq}(e_{id}, e_{iq})$, is preferably calculated according to the difference between the references at step k−2 and present currents as:

$$e_{id}(k) = i_d^*(k) \cdot z^{-2} - i_d(k) \qquad (24)$$

$$e_{iq}(k) = i_q^*(k) \cdot z^{-2} - i_q(k) \qquad (25)$$

Thus, (22)-(25) determine the injected RCC magnitude in the d-axis and q-axis respectively. While an m=2 two time-step delay is considered here, implementations where m>2 are contemplated, e.g. to reduce the transient current control error caused by the non-ideal factors including parameter mismatch and eddy currents.

Additionally, as can be found from the form of (22) and (25), the injected RCC magnitudes can be alternatively generated by an integrator with the dq axis current errors as input, namely:

$$C_d(k) = \frac{K_i T_s}{1 - z^{-1}} \cdot e_{id}(k) \qquad (26)$$

$$C_q(k) = \frac{K_i T_s}{1 - z^{-1}} \cdot e_{iq}(k) \qquad (27)$$

where $K_i$ is the integral gain, $T_s$ is the sampling time-step and the corresponding adaptive gain for minimising the objective function, J, is:

$$\eta_i = K_i T_s \qquad (28)$$

Figure 6:
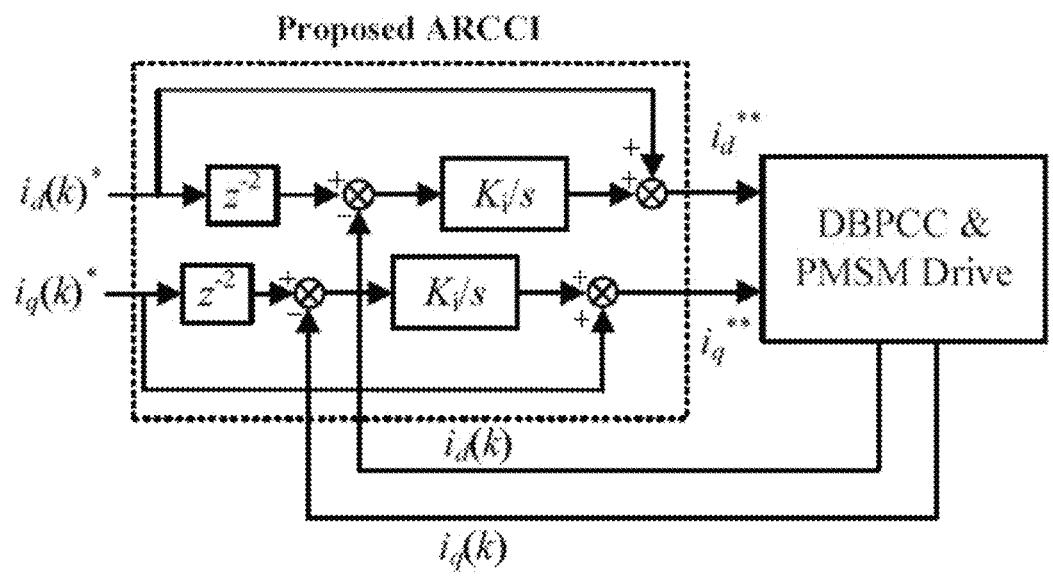
FIG. 6 is a block diagram showing the determination and injection of correcting d- and q-axis currents.

FIG. 6 is a block diagram showing one possible implementation of the DBPCC with the proposed adaptive reference current correction injection. As can be seen, it includes two integrators and the integral gain is set with due consideration of the associated adaptive gain. As the injected RCC varies slowly and can be regarded constant during transients, the transient performance robustness of the DBPCC will be maintained. Therefore, the DBPCC with reference current correction injection is parameter robust in terms of both the steady-state and transient performances.

FIG. 7

Figure 7:
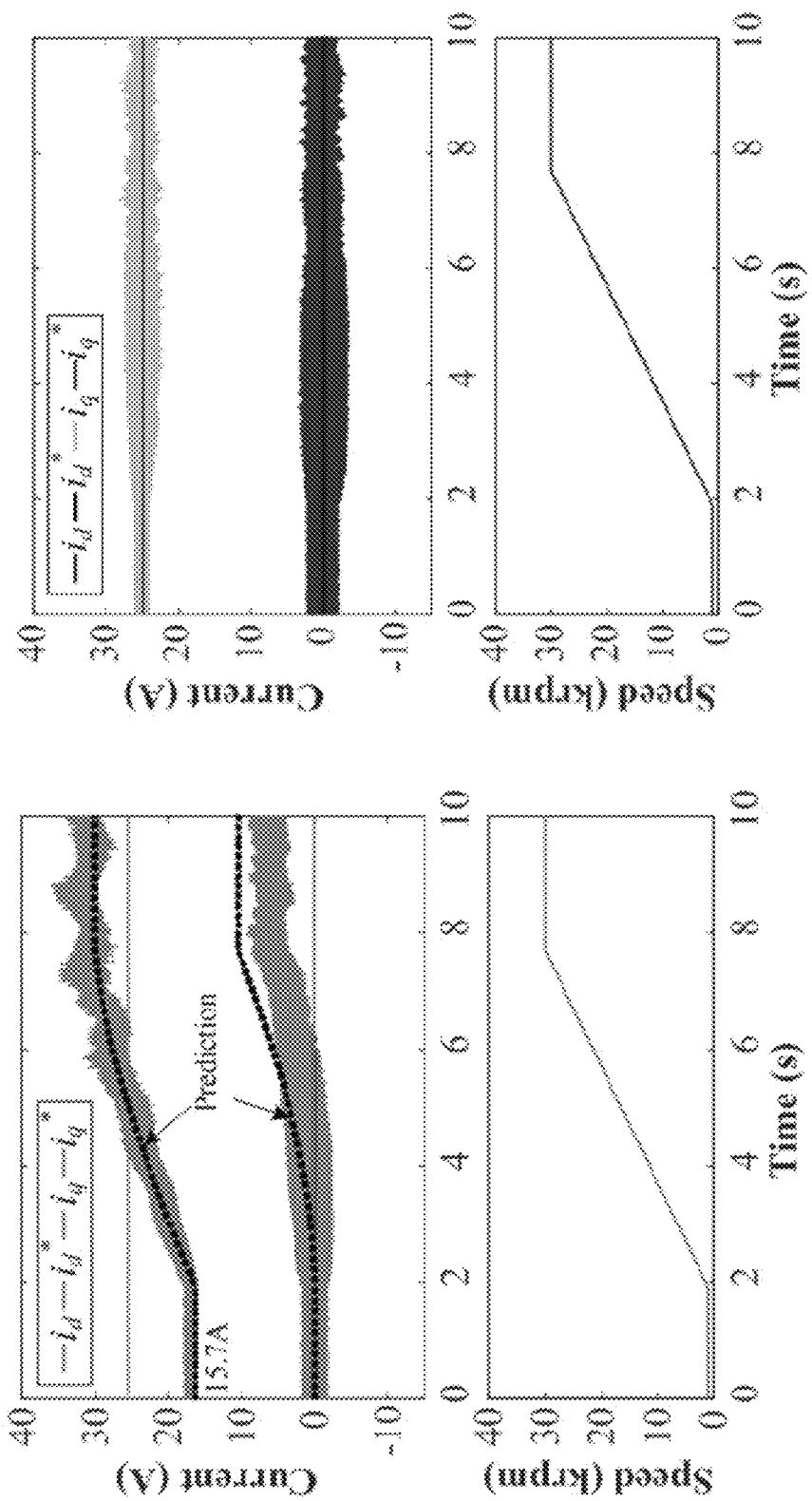
FIG. 7 illustrates improvements in current control provided by the use of the current injection scheme of FIG. 6.

FIG. 7 illustrates the current control performance in a PMSM drive system with and without the reference current correction injection described above with reference to FIG. 6. In both the left-hand and right-hand graphs, a PMSM which is subject to a known machine parameter mismatch (specifically, $\hat{\psi}_m = 1.21\psi_m$) is accelerated from 1,000 rpm (SFR=300) to 30,000 rpm (SFR=10) with constant dq-axis currents of 0 A and 25 A respectively.

Reference current correction injection is not implemented in the left-hand graph. The horizontal lines at 0 and 25 A represent the desired, reference currents $i_d^*$ and $i_q^*$. The actual currents, $i_d$ and $i_q$, are show in shading. It can be seen that as the machine speed increases to a high speed, the actual currents $i_d$ and $i_q$ depart significantly from the horizontal lines (i.e. the desired, reference currents $i_d^*$ and $i_q^*$) because of control error due to inverter non-linearity and the parameter mismatch. The dashed lines represent the theoretically predicted currents, taking into account the known mismatch. It will of course be understood that in a practical system the parameter mismatch would not be accurately known.

The described reference current correction injection is implemented in the right-hand graph. Again, the horizontal lines at 0 and 25 A represent the desired, reference currents $i_d^*$ and $i_q^*$. The actual currents, $i_d$ and $i_q$, are shown in shading. It can be seen that the current control errors, $i_{dq}^* - i_{dq}$, are considerably smaller where the reference current correction injection is implemented.

Figure 8A:
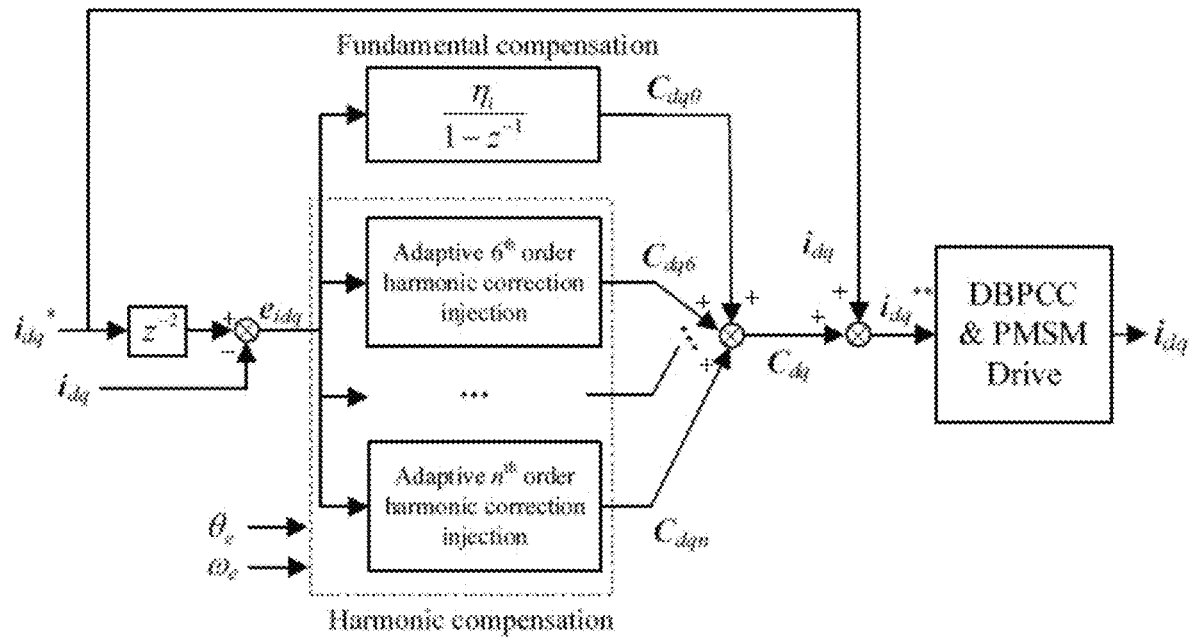
FIGS. 8A-8B are block diagrams showing the determination and injection of correcting d- and q-axis currents for the suppression of harmonics.
Figure 8B:
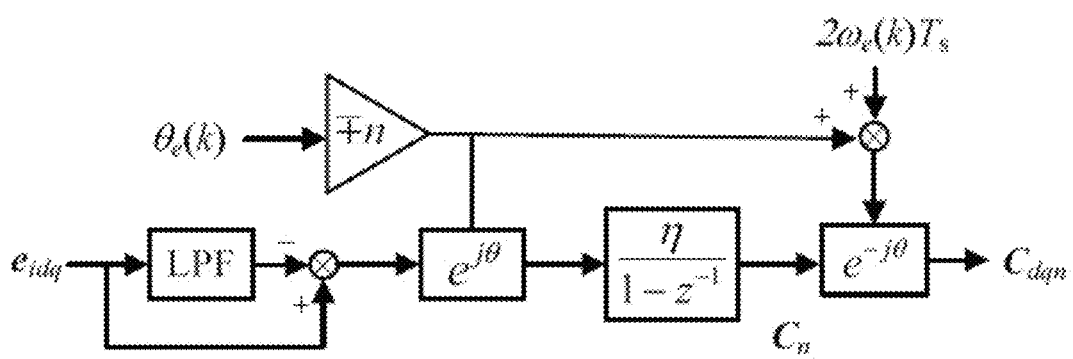

FIGS. 8A and 8B

FIG. 8A illustrates an enhancement to the reference current correction of FIGS. 6-7 in which the injection correction includes, in addition to a fundamental correction component, one or more harmonic correction components. Such an enhancement may be particularly attractive in high-speed drives, where the machine inductance is relatively small and the influences of converter non-linearity and back emf harmonics can be significant unless the excitation current is a high-quality sinusoid.

As can be seen from FIG. 8A, the fundamental and one or more harmonic components can be computed in parallel and then summed to give $C_d$ and $C_q$, which as before are added to $i_d^*$ and $i_q^*$ to give the corrected reference currents $i_d^{}$ and $i_q^{}$.

The desired harmonic component may be derived as follows. To reduce the effect of the harmonic distortion, a harmonic voltage, $V_{dqn}^{h*}$, is injected and the corresponding injected harmonic current is denoted by $i_{dqn}^*$. The actual harmonic current in the $n^{th}$ order harmonic reference frame, $t_{dqn}^h$ can be obtained as:

$$i_{dqn}^h = (V_{dqn}^{h*} + V_{dst\_dqn}^h)/(R \pm jn\omega_e L_s) \tag{29}$$

Given that only the estimated machine parameters are available for calculation of the injected harmonic voltage, $V_{dqn}^{h*}$, the injected harmonic current is given by:

$$i_{dqn}^{h*} = V_{dqn}^{h*}/(\hat{R} \pm jn\omega_e \hat{L}_s) \tag{30}$$

Substituting (30) into (29), a general expression for the $n^{th}$ order harmonic current, $i_{dqn}^h$ can be derived as:

$$i_{dqn}^h = \lambda \cdot i_{dqn}^{h*} + V_{dst\_dqn}^h/(R \pm jn\omega_e L_s) \tag{31}$$

where the parameter mismatch related coefficient $\lambda$ is:

$$\lambda = (\hat{R} \pm jn\omega_e \hat{L}_s)/(R \pm jn\omega_e L_s) \tag{32}$$

As can be found from (31), normally if current harmonic injection is not required, i.e. $i_{dqn}^{h*}=0$, the actual current harmonic will be caused by the inverter nonlinearity and back emf. If the reference current harmonic given in (30) is deliberately injected, the actual harmonic current shown in (31) will be affected not only by the parameter mismatch but also by the voltage distortions. However, if a correcting component, $C_n$ is added into the reference current harmonic, the current harmonic expressed in (31) will be altered as:

$$i_{dqn}^h = \lambda \cdot (i_{dqn}^{h*} + C_n) + \frac{1}{R \pm jn\omega_e L_s} V_{dst\_dqn}^h \tag{33}$$

From (33), the desired correcting component that results in the actual harmonic current being cancelled by the reference can be derived as:

$$C_n = \frac{1-\lambda}{\lambda} \cdot i_{dqn}^{h*} - \frac{1}{R \pm jn\omega_e \hat{L}_s} V_{dst\_dqn}^h \tag{34}$$

Since the correcting component, $C_n$ is injected to correct the actual harmonic current, it may be referred to as the harmonic reference correcting current (RCC). By transforming the RCC from the $n^{th}$ harmonic reference frame to the dq frame, the harmonic RCC can ultimately be injected into the reference dq axis currents and can then be tracked by the aforementioned DBPCC in two time steps.

Without loss of generality, a normal case with zero reference harmonic current, i.e, sinusoidal current in the stationary αβ frame, is considered. In order to suppress the $n^{th}$ order current harmonic, the desired harmonic RCC in (34) to be injected needs to be determined by the harmonic voltage distortion. However, in practice, the actual distortion voltage can hardly be known prior with accuracy. To circumvent this problem, an adaptive algorithm may be designed to calculate the desired injected harmonic RCC online. The objective function to minimize the selective n order harmonic current in the dq frame can be defined as:

$$J_{hn} = \frac{1}{2}(i_{dqn}^{h*} - i_{dqn}^h)^2 = \frac{1}{2}(e_{idqn}^h)^2 \tag{35}$$

where the reference harmonic current $i_{dqn}^{h*}$ is 0 and $e_{idqn}^h$ is the harmonic current control error in the harmonic reference frame. With the expression of $i_{dqn}^h$ (31), the gradient vector of the objective function, $J_{hn}$ against $C_n$ can be obtained as:

$$\nabla J_{hn} = -\lambda e_{idqn}^h \tag{36}$$

As shown in (32), the parameters mismatch related coefficient $\lambda$ is proportional to the inductance mismatch by neglecting the resistance and constant in steady states. Hence it can be simply approximated as 1 and this approximation will not affect the gradient direction. According to the gradient descent updating rule, the injected harmonic RCC magnitudes, $C_n$ is thus determined by:

$$C_n(k+1) = C_n(k) + \eta e_{idqn}^h \tag{37}$$

where q is the adaptive gain, governing the convergence speed of tracking the desired harmonic RCC magnitude in (34).

To determine the harmonic RCC, the harmonic current control error in the reference harmonic frame, $e_{idqn}^h$, should be obtained. In the proposed adaptive harmonic RCC injection (AHRCCI), the harmonic current error information is only required to update the gradient. Hence, instead of using the exact current harmonic error of the $n^{th}$ order to calculate the adaptive gradient in (36), the harmonic current error simply obtained by transforming the current error in the dq frame, $e_{idq}$, into the $n^{th}$ order rotating reference frame can be used. This greatly simplifies the proposed method. Further, to account the intrinsic two time-steps delay of the DBPCC, the dq axis current error, $e_{idq}$, is determined by the difference between the reference at the $(k-2)^{th}$ step and actual currents at the $k^{th}$ step. Therefore, the harmonic current error at the $k^{th}$ step is derived as:

$$e_{idqn}^h(k) = e_{idq}(k) \cdot e^{jn\theta_e}$$
$$= [i_{dq}^*(k) \cdot z^{-2} - i_{dq}(k)] \cdot e^{jn\theta_e(k)} \tag{38}$$

The updating scheme of the injected harmonic RCC in the reference harmonic frame is given by:

$$C_n(k+1) = C_n(k) + \eta e_{idqn}^h(k) \cdot e^{jn\theta_e(k)} \tag{39}$$

Finally, by considering the rotation of the harmonic reference frame in the dq frame over the two time-steps, the harmonic RCC injected to the dq frame can be obtained as:

$$C_{dn}(k+1) = \text{real}[C_n(k+1) \cdot e^{-jn(\theta_e(k) + 2\omega_e T_s)}] \tag{40}$$

$$C_{qn}(k+1) = \text{imag}[C_n(k+1) \cdot e^{-jn(\theta_e(k) + 2\omega_e T_s)}] \tag{41}$$

where real[ ] and imag[ ] represent calculations of the real and imaginary components respectively.

According to (40)-(41), the proposed AHRCCI is actually adding sinusoidal correcting components associated with the n harmonic in the dq frame. This can be easily extended to any selective order of harmonic suppression by just changing the harmonic order, n. Furthermore, as the harmonic reference frame rotation due to rotor movement is taken into account, the adaptive searching is not affected by rotor movement, is independent of speed and is hence effective in the scenarios with low switching-to-harmonic frequency ratios (SHRs).

An implementation of the calculation of the individual harmonic components is illustrated in the block diagram of FIG. 8B. For a $n^{th}$ order harmonic, only the phase angle factor, $\mp n$, needs to be changed according to its harmonic order in the dq frame. For example, to eliminate the current harmonics caused by the inverter nonlinearity, which are mainly $5^{th}$ and $7^{th}$ harmonics in phase currents, the phase angle factor, $\mp n$ are to be set to −6 and 6, respectively. This also applies to the $5^{th}$ and $7^{th}$ harmonics caused by the non-sinusoidal back emf. If higher order harmonics am also of interests for suppression, such as $11^{th}$ and $13^{th}$ harmonics in phase currents, $\mp n$ is equal to −12 and 12 accordingly. If only a specific order harmonic is to be suppressed, $\mp n$ only needs to set with the desired value. For example, to suppress the $2^{nd}$ harmonic in a consequent pole permanent magnet machine, $\mp n$ is set to 1. Similarly, if phase current asymmetry is observed in a machine, $\mp n$ can be set to 2 to suppress the third harmonics.

As shown in FIG. 8A, in order to suppress multiple current harmonics the derived harmonic RCCs are summed and added to the dq axis current reference. Further, a simple high-pass-filter of the current error, formed by subtracting the low-pass-filter (LPF) output from the original error may be employed to minimize the influence of DC offset error in the dq frame. The design of the LPF is not critical and its bandwidth can be simply set to low or being a fractional of the fundamental frequency. The adaptive gain, η, determining the elimination rate of the harmonic current can be generally set to a small constant between 0.005 and 0.05.

Like the current correction injection of FIGS. 6-7, this harmonic suppression method is not dependent on machine or converter parameters. Furthermore, since the control delay of harmonic suppression is accurately considered, it is effective for both low and high speeds with low switching-to-harmonic frequency ratios.

FIG. 9

Figure 9:
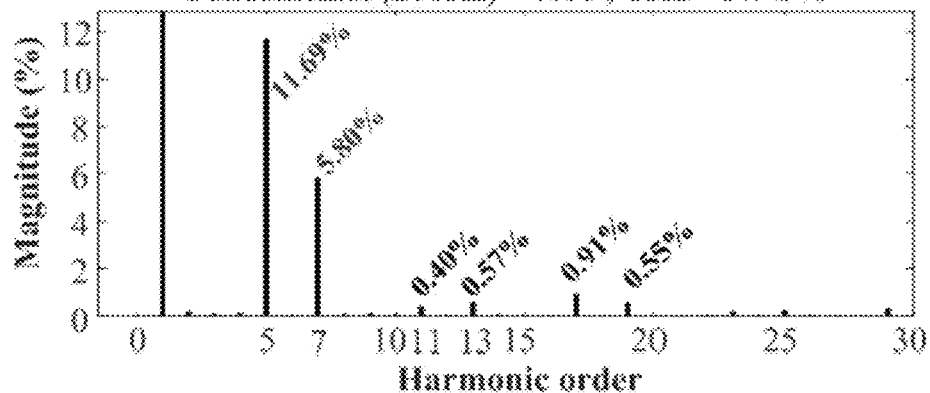
FIG. 9 illustrates improvements in harmonic distortion provided by the harmonic suppression scheme of FIG. 8.
Figure 9:
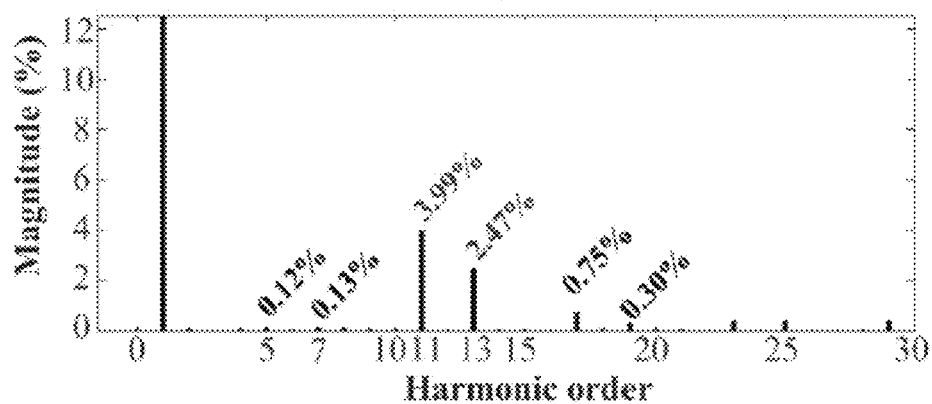
Figure 9:
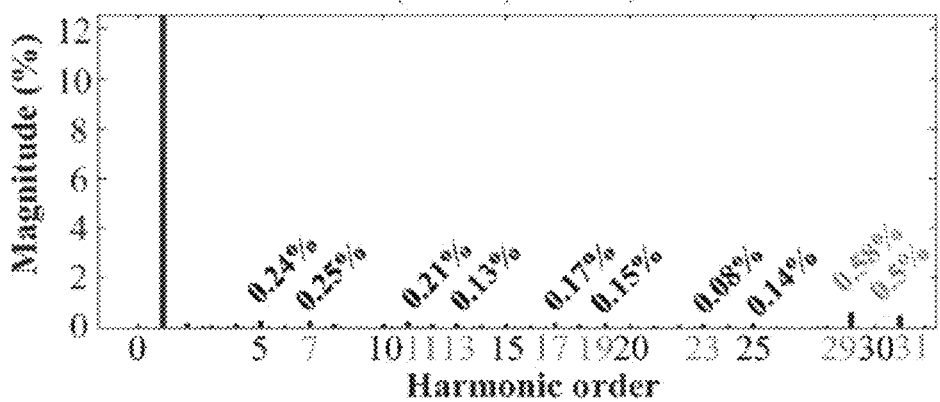

FIG. 9 illustrates the harmonic distortion in a PMSM drive system with and without the harmonic reference current correction injection described above with reference to FIGS. 8A-8B. Parameters of the PMSM drive system are summarized below in Table 1.

TABLE 1

| Parameters of the prototype SPMSM Drive | |
|---|---|
| Parameter | Magnitude |
| Number of poles pairs | 2 |
| Phase resistance | 20 mΩ |
| d-axis inductance | 125 µH |
| q-axis inductance | 134.2 µH |
| PM flux linkage | 9.83 mWb |
| Rated phase current (peak) | 50 A |
| Rated torque | 1.5 Nm |
| Rated speed | 30,000 rpm |
| Rated power | 5 kW |
| DC-link voltage | 270 V |
| Switching/Sampling frequency | 10 kHz |
| Dead-time | 2 µs |

The first graph of FIG. 9 illustrates the harmonic current components with only the fundamental correction (i.e. using the approach of FIG. 6). The second graph illustrates the harmonic current components with some targeted harmonic correction, specifically the injection of corrections for only the $5^{th}$ and $7^{th}$ order harmonics. The third graph illustrates the harmonic current components with more extensive harmonic correction, specifically the injection of corrections for all harmonics up to the $25^{th}$ order.

As can be seen from the first graph, the total harmonic distortion (THD) in the absence of any harmonic suppression is 14.43%. The $5^{th}$, and $7^{th}$ order harmonics can be seen to be the dominant harmonics, with smaller but notable contributions from the $11^{th}$, $13^{th}$, $17^{th}$ and $19^{th}$ order harmonics.

In the second graph, the harmonic correction components are injected for the $5^{th}$ and $7^{th}$ order harmonics. This significantly reduces the THD from 14.43% to 7.66%, with the contributions of the $5^{th}$ and $7^{th}$ order harmonics almost completely eliminated. There is however some increase in the contribution from the $11^{th}$ and $13^{th}$ order harmonics.

In the third graph, the harmonic correction components are injected for all harmonics up to the 25th order. There is a further reduction in the THD to 6.01%, with no major contributions from any harmonic order.

It will be appreciated that the computational requirements associated with the calculation of the harmonic correction components increases as the number of targeted harmonics increases. Targeting only the $5^{th}$ and $7^{th}$ orders results in a significant decrease in THD, with a relatively modest increase in computational requirements. Further targeting the $11^{th}$ and $13^{th}$ order harmonics, and more generally harmonic orders n satisfying (n+1)/6=p and (n−1)/6=p for integers p up to a maximum integer value P, provides the largest decrease in THD without an excessive computational burden. Additionally or alternatively, if the $2^{nd}$ and $3^{rd}$ current harmonics arise due to the design and manufacture of machine, these may be targeted with only a slight increase in the computation burden.

FIG. 10

As a further enhancement to the above techniques, the actual inductance of the PMSM (i.e. the true value, rather than the machine model value of the inductance which may be subject to parameter mismatch) may be estimated to improve the performance of the DBPCC scheme. Such an enhancement may be particularly attractive in a high-speed drive which may exhibit large inductance mismatch.

To appreciate why inductance identification may be of benefit, first consider that, using the DBPCC and reference correcting current injection approaches described in FIG. 6 and FIGS. 8A-B, the current control error at step k can be derived as:

$$e_{idq}(k) = \frac{1}{L_s}\left[(\Delta L_s i_{dq}^* + \Delta \psi_m) - (\Delta L_s i_{dq}(k) + \Delta \psi_m) \cdot e^{j2\omega_e T_s}\right] + d_{inv} + C_{dq} \quad (42)$$

where, the variables in bold represent the corresponding vectors in the dq frame, $d_{inv}$ is the disturbance caused by inverter nonlinearity, and $C_{dq}$ is sum of injected current correction obtained from the approach described in FIG. 8. $L_s$ is the real synchronous inductance. $i_{dq}^*$ is the associated reference current, acquired two time-step ahead given the two time-step delay characteristic of DBPCC.

At step k, assuming that a steady state is reached associated with reference current of $i_{dq1}^*$, the current control error, $e_{idq1}(k)$ can be regarded close to zero considering the effectiveness of the injected current correction. This gives:

$$e_{idq1}(k) = \tag{43}$$

$$\frac{1}{L_s}\left[\left(\Delta L_s i_{dq1}^* + \Delta\psi_m\right) - \left(\Delta L_s i_{dq}(k) + \Delta\psi_m\right) \cdot e^{-j2\omega_e T_s}\right] + d_{inv} + C_{dq} = 0$$

However, if at step k−2 the reference current changes from $i_{dq1}^*$ to $i_{dq2}^*$ (i.e. a transient occurs), the current control error at step k, referred to as transient current tracking error, $e_{idqT}$, (42) and (43) can be combined to give:

$$e_{idqT} = \frac{\Delta L_s}{L_s} \cdot \left(i_{dq2}^* - i_{dq1}^*\right) \tag{44}$$

From (44), it can be seen that if the inductance is over-estimated, there will be overshoot currents when the reference current steps up. Likewise, with underestimated inductance, undershoot currents would emerge and slower the dynamic response of DBPCC. Therefore, an inductance identification method is proposed to calculate the real inductance of machine to reduce undershooting and overshooting of the currents.

The proposed inductance identification method exploits the transient tracking error and reference current variation information, which are already available in the current controller. Based on (44), the real machine inductance can be calculated. An implementation example of q-axis inductance identification is shown in FIG. 10.

Figure 10:
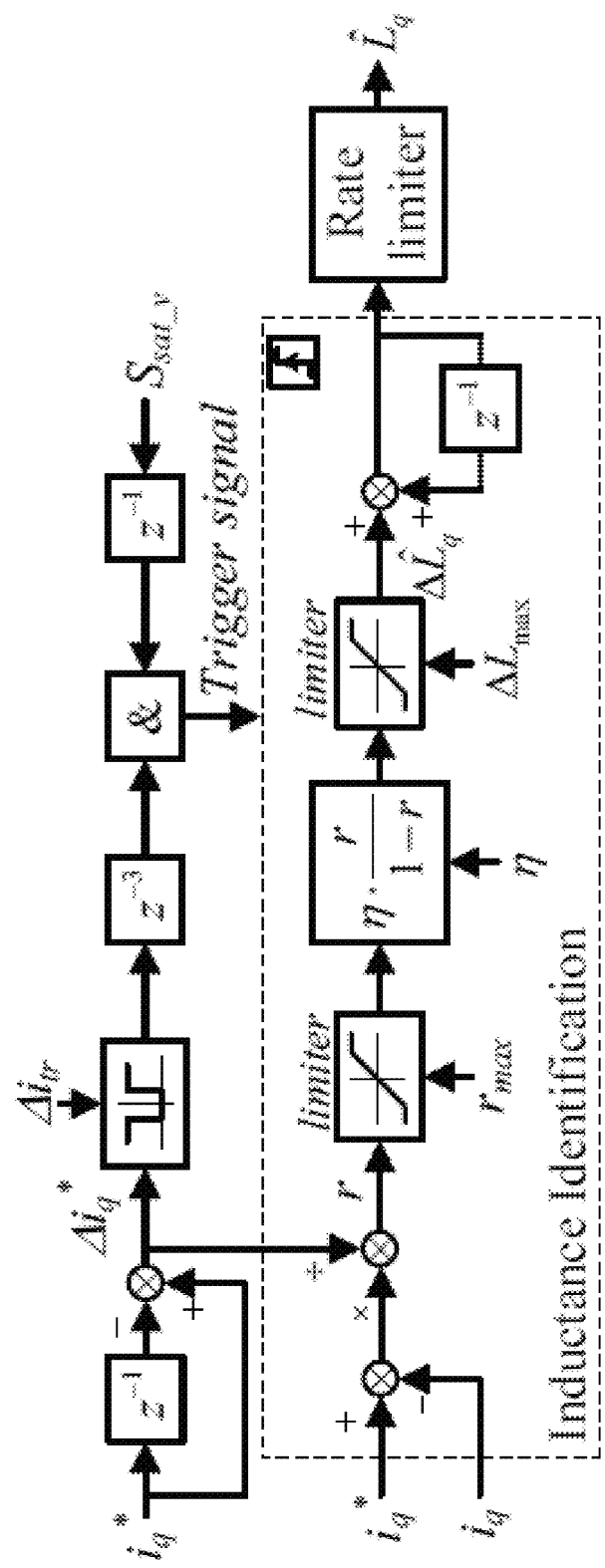
FIG. 10 is a block diagram showing the estimation of the inductance of the PMSM.

In the embodiment shown in FIG. 10, the inductance identification is triggered in response to a rising edge of the trigger signal. $\Delta i_{tr}$ is the threshold set to recognize the transient and $S_{sat\_v}$ is the inverter voltage saturation indicating signal, with 0 denoting the voltage is saturated and 1 denoting the voltage is not saturated. The inductance identification is triggered each time that the reference variation, $\Delta i_q^*$, two or three time-steps ahead (reflected in the block of $z^3$ after $\Delta_q^*$ in FIG. 10) is larger than the pre-defined threshold, $\Delta i_{tr}$ and the inverter voltage in the last time-step is not saturated.

$$\Delta i_q^* = i_q^* - i_q^* \cdot z^{-1} \tag{45}$$

When the inductance identification is triggered, the ratio, denoted as r, between the current error, (i.e. the transient current tracking error) and the reference variation is calculated:

$$r = (i_q^* - i_q)/\Delta i_q^* \tag{46}$$

By comparison with (44) it can be seen that this ratio is effectively equal to:

$$r = \Delta L_s / L_s \tag{47}$$

Considering the definition of $\Delta L_s$, the real machine inductance can then be calculated as:

$$L_s = \hat{L}_s + \frac{r}{1-r} \cdot \hat{L}_s \tag{48}$$

where $\hat{L}_s$ is estimated inductance presently used.

As shown in FIG. 10, a limit, $r_{max}$, may be set to constrain the absolute value of r. A correction factor, $\eta<1$, may also be set to adjust the extent of the updating of the identified inductance in (48). A maximum correction of the estimated inductance, $\Delta L_{max}$, may be set to avoid excessive correction of the estimated inductance in a inductance identification process.

The described calculation of real-inductance may only be executed once in the time-step when trigged. As illustrated, the output of the inductance identification block may be fed to a rate limiter block or a low-pass filter in order to avoid the undesirable transient causing by abrupt change of machine parameter. The calculated q-axis inductance, $\hat{L}_q$, will be delivered to the DBPCC block and replace with the previous estimated/name-plated q-axis inductance.

Those skilled in the art will appreciate that the parameters introduced in FIG. 10, i.e. $\Delta i_{tr}$, $r_{max}$, $\eta$, $\Delta L_{max}$, can be readily set according to the specification of a machine. For example, $\Delta i_{tr}$ can be generally set to ~10% of the rated current. To give a fast identification of the real inductance, $r_{max}$ and $\eta$ can be generally set to about 0.5 and 1, respectively, and $\Delta L_{mx}$ can be set to the presently identified inductance. However, setting these values lower can make the identified inductance approach the real value more gradually, with less ripple.

For surface mounted PMSMs, the d-axis inductance is usually assumed to be equal to the identified q-axis inductance, i.e. collectively referred to as synchronous inductance. Hence, for surface mounted PMSMs the approach of FIG. 10 effectively identifies the synchronous inductance. For interior mounted PMSMs, the d-axis inductance can be identified in the similar manner as that for q-axis inductance in FIG. 10, by using the quantities in the d-axis accordingly.

Generally, for any machine where constant d-axis reference current control is employed, e.g. $i_d=0$ control, there is no need to identify the real d-axis inductance as one can know from (44) that the transient performance deterioration due to d-axis inductance occurs when there is reference variation in the d-axis.

It is noted that the described inductance identification method only leverages the transient current tracking error caused by inductance mismatch and the current information which is already available in the control. It is thus non-intrusive and adds almost no extra cost to the system.

By employing the identified inductance, the transient performance can be significantly improved. Even in the presence of parameter mismatch, inverter nonlinearity and other non-ideal factors such as back emf harmonics, nearly ideal deadbeat current control can be achieved and transient overshoot currents and low frequency current ripples are virtually eliminated.

FIG. 11

Figure 11:
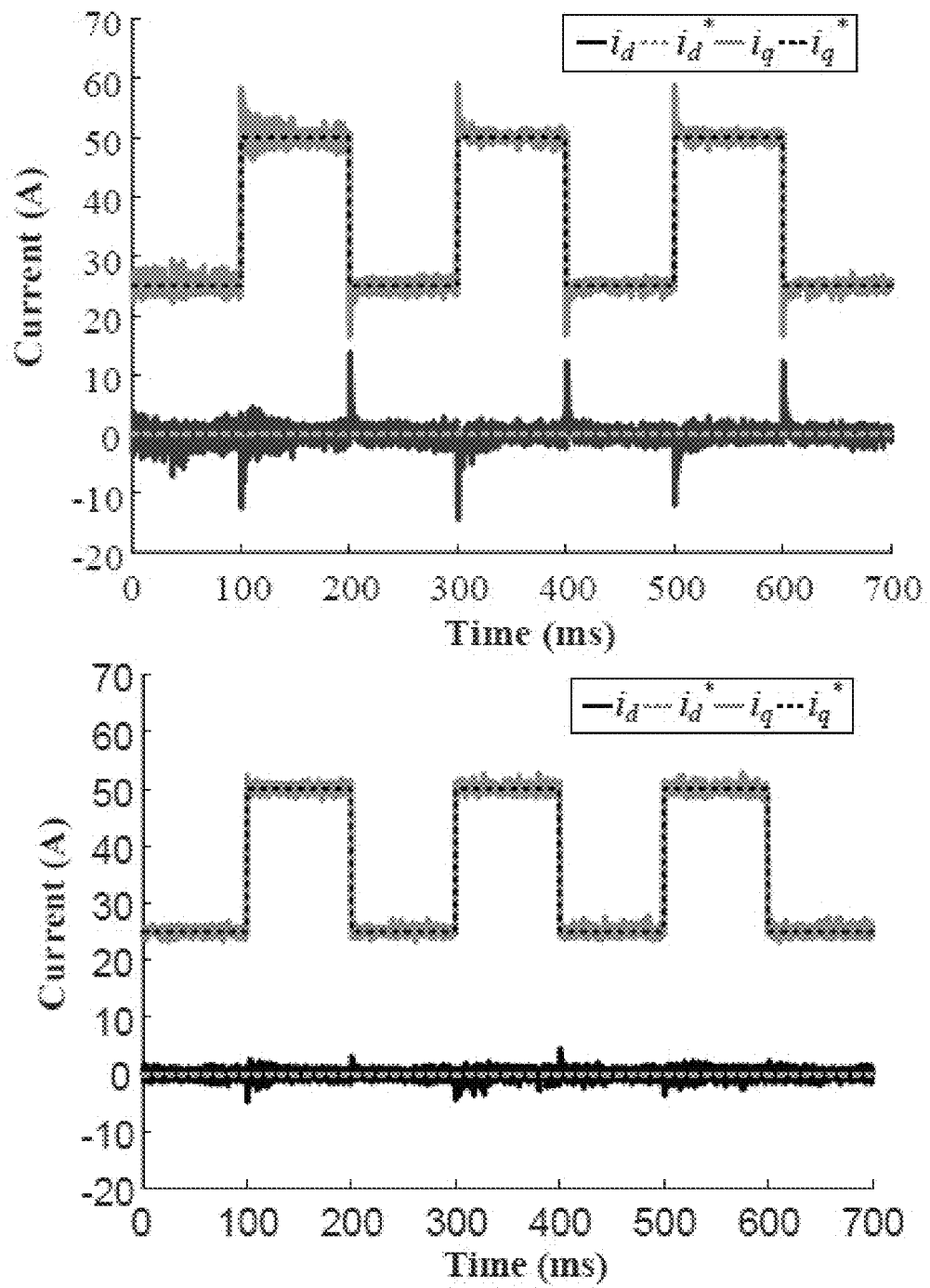
FIG. 11 illustrates improvements in current control provided by the use of the inductance identification scheme of FIG. 10.

FIG. 11 illustrates the current control performance in a PMSM drive system with and without the inductance identification method described above with reference to FIG. 10. In both graphs, a PMSM which is subject to a known machine parameter mismatch (specifically, $\hat{\Psi}_m=1.2\Psi_m$, $\hat{L}_d=1.2\,L_d$, $\hat{L}_q=1.5\,L_q$) is operated at 30,000 rpm (SFR=10) with q-axis current reference steps between 25 A and 50 A.

Inductance identification is not implemented in the first graph. The dotted horizontal line at 0 A represents the desired, reference current $i_d^*$ and the dotted pulses varying between 25 A and 50 A represents the desired, reference current, $i_q^*$. The actual currents, $i_d$ and $i_q$, are show in shading. It can be seen that large transient current errors and cross-coupling between the dq axes occur in transients when the reference current changes, caused by the inductance mismatch.

The described inductance identification is implemented in the second graph. Again, the dotted horizontal line at 0 A represents the desired, reference current $i_d^*$ and the dotted pulses varying between 25 and 50 A represent the desired, reference current, $i_q^*$. The actual currents, $i_d$ and $i_q$, are show in shading. It can be seen that the transient overshoot current and dq-axis cross-coupling effect are significantly reduced where the inductance identification is implemented.

FIG. 12

Figure 12:
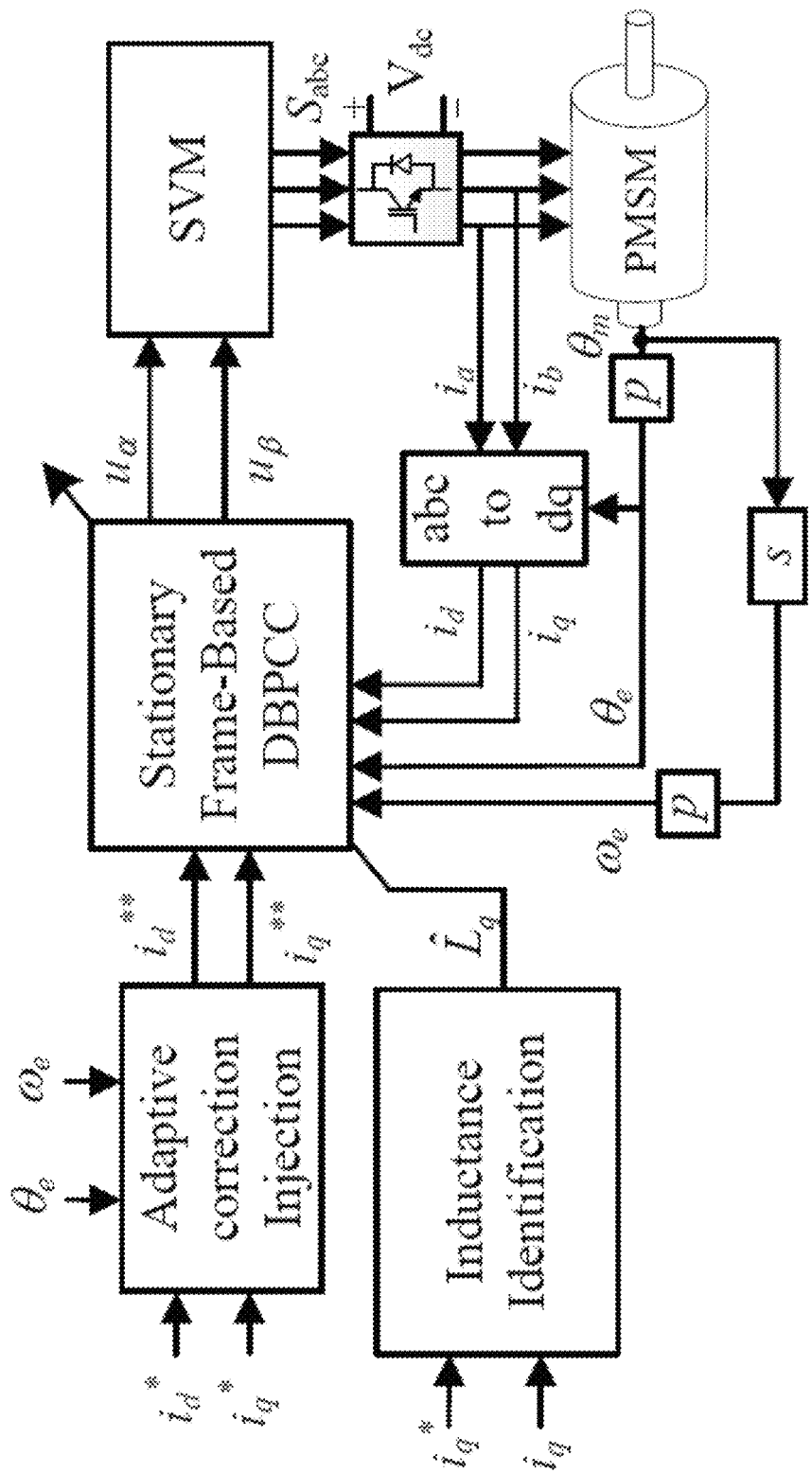
FIG. 12 is a block diagram of a DBPCC scheme incorporating the techniques of FIGS. 6, 8A-B and 10.

FIG. 12 illustrates how the current correction injection techniques of FIGS. 6-9 and the inductance identification method of FIGS. 10-11 may both be utilized within a DBPCC scheme such as the one described above with reference to FIG. 5. It will however be appreciated that in some embodiments of the present disclosure the inductance identification enhancement of FIG. 10 and/or the harmonic suppression enhancement of FIGS. 8-9 may be omitted.

The techniques described herein may provide one or more of the following advantages:

i. Robustness against machine parameter deviation and power converter nonlinearity. This is because the steady-state current control errors due to parameter mismatches and converter nonlinearity may be compensated in the proposed method. The reference currents may be corrected adaptively according to the feedback of current errors, which can then be driven to zero.

ii. Ease of implementation and effectiveness even where the sampling-to-harmonic frequency ratios (SHRs) are low. The proposed method may mainly consist of integrators and there may only one parameter to be tuned. The proposed method may account for the delay effect in high-speed drives in which the control interval may not be sufficiently small, as some prior techniques assume.

iii. Fast dynamic current control with improved transient stability. The proposed technique may achieve nearly ideal dynamic response of the deadbeat control by accounting for the effect of rotor movement, adaptive compensation for errors caused by parameter mismatches, and real-time inductance identification.

iv. Reduction of THD in a motor drive system. This is derived from adaptive compensation for the errors caused by inverter nonlinearity and back emf harmonics and may be enabled by a simple algorithm and hence high attainable control bandwidth.

v. Applicability to both salient and non-salient high-speed PMSM drives in both constant-torque and constant-power operating regions. Particularly, robust flux weakening operation of high-speed drives can be realized with the proposed method as very fast and robust control of dq-axis currents can be implemented. Consequently, the control loop to generate the d-axis flux weakening current reference can be effectively decoupled.

vi. Improvements to the stability and reliability of a more electric, hybrid electric or full electric propulsion system.

vii. Reduced losses and increased system efficiency.

viii. Cost reduction in sampling and control hardware

Various examples have been described, each of which feature various combinations of features. It will be appreciated by those skilled in the art that, except where clearly mutually exclusive, any of the features may be employed separately or in combination with any other features and the embodiments extend to and include all combinations and sub-combinations of one or more features described herein.

It will also be appreciated that whilst the embodiments have been described with reference to aircraft and aircraft propulsion systems, the electric machine drive techniques described herein could be used for many other applications. These include, but are not limited to, automotive, marine and land-based applications.

Annex $\omega_e$ . . . Speed of PMSM
$\Theta_e$ . . . Rotor angular position
$L_s$ . . . Actual synchronous inductance of PMSM
$L_s'$ . . . Model synchronous inductance
$\Delta L_s$ . . . Synchronous inductance parameter mismatch
$\psi_m$ . . . Actual permanent magnet flux linkage of PMSM
$\psi m'$ . . . Model permanent magnet flux linkage
$\Delta \psi_m$ . . . Flux linkage parameter mismatch
$T_s$ . . . Sampling time-step
i . . . Actual PMSM stator current
i* . . . Reference current value
ii* . . . Corrected reference current value
C . . . Current correction value
$e_i$, $e_i$ . . . Current error value
$\eta$ . . . Adaptive gain value
K . . . Integral gain
Subscript d, q . . . d-axis and q-axis values in dq reference frame
Subscript $\alpha$, $\beta$ . . . $\alpha$-axis and $\beta$-axis values in $\alpha\beta$ reference frame
k, k+1 . . . variable at the $k^{th}$, $k+1^{th}$ . . . step
s . . . Laplace operator
z . . . Laplace operator in discrete form
$z^m$ . . . Delay by m steps

The invention claimed is:

1. A method of controlling a permanent magnet synchronous electric machine (PMSM) drive using a Deadbeat Predictive Current Control (DBPCC) scheme, the method comprising:
   determining d-axis and q-axis stator current values ($i_d$, $i_q$) representative of a measured PMSM current;
   determining d-axis and q-axis reference current values ($i_d^*$, $i_q^*$);
   based on the stator current values ($i_d$, $i_q$) and the reference current values ($i_d^*$, $i_q^*$), determining d-axis and q-axis current correction values ($C_d$, $C_q$) according to the equations:

$$C_d(k) = \frac{\eta}{1-z^{-1}} \cdot e_{id}(k)$$

$$C_q(k) = \frac{\eta}{1-z^{-1}} \cdot e_{iq}(k)$$

wherein n is a gain value, and $e_{id}$ and $e_{iq}$ are d-axis and q-axis current errors;
   determining corrected reference current values ($i_d^{}$, $i_q^{}$) as a sum of the reference current values ($i_d^*$, $i_q^*$) and the current correction values ($C_d$, $C_q$); and
   controlling the PMSM drive using the corrected reference current values ($i_d^{}$, $i_q^{}$) as reference current inputs of the DBPCC scheme.

2. The method of claim 1, in which the d-axis and q-axis current correction values ($C_d$, $C_q$) are determined independent of parameters of the PMSM and power electronics associated with the PMSM.

3. The method of claim 1, further comprising:
   determining an estimate of an inductance ($L_s$) of the PMSM, and
   wherein controlling the PMSM drive further comprises using the estimated inductance ($L_s$) of the PMSM as an input of the DBPCC scheme.

4. The method of claim 3, in which the determination of the estimate of the inductance ($L_s$) of the PMSM is based on one or more reference current values ($i_d^*$, $i_q^*$) and one or more stator current values ($i_d$, $i_q$) during a transient.

5. The method of claim 3, in which the determination of the estimate of the inductance ($L_s$) of the PMSM is based on a difference between a reference current value ($i_d^*$, $i_q^*$) and a stator current value ($i_d$, $i_q$).

6. The method of claim 3, in which the estimate of the inductance ($L_s$) of the PMSM is determined according to the equations:

$$L_s = \hat{L}_s + \frac{r}{1-r} \cdot \hat{L}_s$$
$$r = (i_q^* - i_q)/\Delta i_q^*$$
$$\Delta i_q^* = i_q^* - i_q^* \cdot z^{-1}$$

wherein $\hat{L}_s$ is a previous estimate of the inductance of the PMSM and z is is the Laplace operator in discrete form.

7. The method of claim 1, in which the PMSM is controlled to rotate at a speed greater than or equal to 12,000 rpm.

8. The method of claim 1, in which the PMSM drive is controlled to operate at a switching-to-fundamental ratio (SFR) of less than or equal to 10, the SFR being defined as:

$$SFR = \frac{f_{inv}(Hz)}{f_e(Hz)}$$

wherein $f_{inv}$ is a switching frequency of power electronics associated with the PMSM, and $f_e$ is a fundamental electrical frequency of the PMSM.

9. A controller for use in a system comprising a permanent magnet synchronous electric machine (PMSM) and associated power electronics, the controller being configured to:
receive d-axis and q-axis stator current values ($i_d$, $i_q$) representative of a measured PMSM current;
receive d-axis and q-axis reference current values ($i_d^*$, $i_q^*$);
based on the stator current values ($i_d$, $i_q$) and the reference current values ($i_d^*$, $i_q^*$), determine d-axis and q-axis current correction values ($C_d$, $C_q$) according to the following equations:

$$C_d(k+1) = C_d(k) + \eta e_{id}(k)$$
$$C_q(k+1) = C_q(k) + \eta e_{iq}(k)$$
$$e_{id}(k) = i_d^*(k) \cdot z^{-m} - i_d(k)$$
$$e_{iq}(k) = i_q^*(k) \cdot z^{-m} - i_q(k)$$

wherein $\eta$ is a pre-selected gain value, and $e_{id}$ and $e_{iq}$ are d-axis and q-axis current errors, and wherein z is the Laplace operator in discrete form, m is an integer greater than or equal to 2, and k is an integer;
determine corrected reference current values ($i_d^{}$, $i_q^{}$) as a sum of the reference current values ($i_d^*$, $i_q^*$) and the current correction values ($C_d$, $C_q$); and
control the PMSM using the corrected reference current values ($i_d^{}$, $i_q^{}$) as reference current inputs to a Deadbeat Predictive Current Control (DBPCC) scheme.

10. A system comprising a permanent magnet synchronous electric machine (PMSM); power electronics in electrical communication with the PMSM; and the controller as claimed in claim 9.

11. The system of claim 10, in which a maximum rated speed of the PMSM is greater than or equal to 15,000 rpm.

12. An aircraft propulsion system comprising the system of claim 10.

13. A controller for use in a system comprising a permanent magnet synchronous electric machine (PMSM) and associated power electronics, the controller being configured to:
receive d-axis and q-axis stator current values ($i_d$, $i_q$) representative of a measured PMSM current;
receive d-axis and q-axis reference current values ($i_d^*$, $i_q^*$);
based on the stator current values ($i_d$, $i_q$) and the reference current values ($i_d^*$, $i_q^*$), determine d-axis and q-axis current correction values ($C_d$, $C_q$) by determination and summation of a plurality of current correction components including a fundamental current correction component ($C_{d,0}$, $C_{q,0}$) and at least one harmonic current correction component ($C_{d,n}$, $C_{q,n}$);
determine corrected reference current values ($i_d^{}$, $i_q^{}$) as a sum of the reference current values ($i_d^*$, $i_q^*$) and the current correction values ($C_d$, $C_q$); and
control the PMSM using the corrected reference current values ($i_d^{}$, $i_q^{}$) as reference current inputs to the DBPCC scheme.

14. The controller of claim 13, in which the at least one harmonic current correction component ($C_{d,n}$, $C_{q,n}$) includes at least one $n^{th}$ order harmonic current correction component, wherein n satisfies: (n+1)/6=p or (n−1)/6=p, p being an integer.

15. The controller of claim 13, in the at least one harmonic current correction component ($C_{d,n}$, $C_{q,n}$) includes a second and/or third order harmonic current correction component.

16. The controller of claim 13, in which each one of the at least one harmonic component is determined based at least in part on a rotor angular position of the PMSM ($\Theta_e$); a rotor angular speed of the PMSM ($\omega_e$); and a phase factor ($\mp$n) determined according to a harmonic order (n) of the harmonic component.

* * * * *